(12) United States Patent
Cornwall et al.

(10) Patent No.: US 7,830,874 B2
(45) Date of Patent: Nov. 9, 2010

(54) VERSATILE RADIO PACKETING FOR AUTOMATIC METER READING SYSTEMS

(75) Inventors: Mark Cornwall, Spokane, WA (US); Matt Johnson, Spokane, WA (US); John Buffington, Hauser, ID (US)

(73) Assignee: Itron, Inc., Liberty Lake, WA (US)

( * ) Notice: Subject to any disclaimer, the term of this patent is extended or adjusted under 35 U.S.C. 154(b) by 735 days.

(21) Appl. No.: 11/702,428

(22) Filed: Feb. 5, 2007

(65) Prior Publication Data

US 2007/0211768 A1 Sep. 13, 2007

Related U.S. Application Data

(60) Provisional application No. 60/764,823, filed on Feb. 3, 2006, provisional application No. 60/771,829, filed on Feb. 9, 2006, provisional application No. 60/788,653, filed on Apr. 3, 2006.

(51) Int. Cl.
*H04L 12/28* (2006.01)
(52) U.S. Cl. .................. 370/389; 370/469; 370/471; 370/472; 370/473; 370/474
(58) Field of Classification Search ............... 370/389, 370/392, 395.1, 395.3, 469, 470, 471, 472, 370/473, 474, 475
See application file for complete search history.

(56) References Cited

U.S. PATENT DOCUMENTS

| | | |
|---|---|---|
| 4,352,164 A | 9/1982 | Reed et al. |
| 4,504,831 A | 3/1985 | Jahr et al. |
| 4,525,669 A | 6/1985 | Holberton et al. |
| 4,757,456 A | 7/1988 | Benghiat |
| 4,799,059 A | 1/1989 | Grindahl et al. |
| 4,988,972 A | 1/1991 | Takagi |
| 5,194,860 A | 3/1993 | Jones et al. |
| 5,270,704 A | 12/1993 | Sosa Quintana et al. |
| 5,278,551 A | 1/1994 | Wakatsuki et al. |
| 5,438,329 A | 8/1995 | Gastouniotis et al. |
| 5,448,747 A | 9/1995 | Garverick et al. |
| 5,473,322 A | 12/1995 | Carney |
| 5,553,094 A | 9/1996 | Johnson et al. |
| 5,606,913 A | 3/1997 | Kowalewski |
| 5,617,084 A | 4/1997 | Sears |

(Continued)

FOREIGN PATENT DOCUMENTS

EP 1265450 A2 12/2002

(Continued)

OTHER PUBLICATIONS

Mobile Collector 2.0 User's Guide, Itron, inc., Spokane, WA, 2003, pp. i-84.

(Continued)

*Primary Examiner*—Jayanti K Patel
*Assistant Examiner*—Bo Hui A Zhu
(74) *Attorney, Agent, or Firm*—Dority & Manning, P.A.

(57) ABSTRACT

Methods and systems of providing positive outage notification are described. In some examples, the system determines there is an outage at a facility and transmits multiple messages notifying a utility of the outage. In some examples, the messages are received at multiple message collectors. In some examples, the system determines restoration procedures based on the messages.

37 Claims, 19 Drawing Sheets

U.S. PATENT DOCUMENTS

| | | | |
|---|---|---|---|
| 5,874,903 A | 2/1999 | Shuey et al. |
| 5,897,607 A | 4/1999 | Jenney et al. |
| 5,898,384 A | 4/1999 | Alt et al. |
| 5,914,673 A | 6/1999 | Jennings et al. |
| 6,006,212 A | 12/1999 | Schleich et al. |
| 6,014,089 A | 1/2000 | Tracy et al. |
| 6,067,029 A | 5/2000 | Durston |
| 6,088,659 A | 7/2000 | Kelley et al. |
| 6,100,817 A | 8/2000 | Mason et al. |
| 6,163,276 A | 12/2000 | Irving et al. |
| 6,181,258 B1 | 1/2001 | Summers et al. |
| 6,195,018 B1 | 2/2001 | Ragle et al. |
| 6,219,655 B1 | 4/2001 | Schleich et al. |
| 6,229,451 B1 | 5/2001 | Brown |
| 6,232,886 B1 | 5/2001 | Morand |
| 6,239,589 B1 | 5/2001 | Windsheimer |
| 6,246,677 B1 | 6/2001 | Nap et al. |
| 6,249,516 B1 | 6/2001 | Brownrigg et al. |
| 6,256,128 B1 | 7/2001 | Lavoie et al. |
| 6,259,972 B1 | 7/2001 | Sumic et al. |
| 6,300,881 B1 | 10/2001 | Yee et al. |
| 6,363,057 B1 | 3/2002 | Ardalan et al. |
| 6,374,188 B1 | 4/2002 | Hubbard et al. |
| 6,393,341 B1 | 5/2002 | Lawrence et al. |
| 6,396,839 B1 | 5/2002 | Ardalan et al. |
| 6,452,490 B1 | 9/2002 | Garland et al. |
| 6,452,986 B1 | 9/2002 | Luxford et al. |
| 6,477,558 B1 | 11/2002 | Irving et al. |
| 6,512,463 B1 | 1/2003 | Campbell et al. |
| 6,628,207 B1 | 9/2003 | Hemminger et al. |
| 6,657,549 B1 | 12/2003 | Avery et al. |
| 6,657,552 B2 | 12/2003 | Belski et al. |
| 6,677,862 B1 | 1/2004 | Houlihane et al. |
| 6,700,902 B1 | 3/2004 | Meyer et al. |
| 6,748,475 B1 | 6/2004 | Sørensen |
| 6,778,099 B1 | 8/2004 | Meyer et al. |
| 6,798,353 B2 | 9/2004 | Seal et al. |
| 6,868,293 B1 | 3/2005 | Schurr |
| 6,885,309 B1 | 4/2005 | Van Heteren |
| 6,888,876 B1 | 5/2005 | Mason, Jr. et al. |
| 6,940,868 B1 | 9/2005 | Barbour et al. |
| 6,963,285 B2 | 11/2005 | Fischer et al. |
| 6,996,215 B2 | 2/2006 | MacConnell |
| 7,012,546 B1 | 3/2006 | Zigdon et al. |
| 7,109,882 B2 | 9/2006 | Angelis et al. |
| 7,283,062 B2 | 10/2007 | Hoiness et al. |
| 7,346,030 B2 * | 3/2008 | Cornwall | 370/330 |
| 7,362,236 B2 | 4/2008 | Hoiness |
| 7,400,264 B2 | 7/2008 | Boaz |
| 2002/0063635 A1 | 5/2002 | Shincovich |
| 2002/0071478 A1 | 6/2002 | Cornwall et al. |
| 2002/0109607 A1 | 8/2002 | Cumeralto et al. |
| 2002/0188702 A1 | 12/2002 | Short et al. |
| 2003/0040844 A1 | 2/2003 | Spool et al. |
| 2003/0063723 A1 | 4/2003 | Booth et al. |
| 2003/0204756 A1 | 10/2003 | Ransom et al. |
| 2003/0235194 A1 | 12/2003 | Morrison |
| 2004/0019518 A1 | 1/2004 | Abraham et al. |
| 2004/0021568 A1 | 2/2004 | Seal et al. |
| 2004/0030745 A1 | 2/2004 | Boucher et al. |
| 2004/0093209 A1 | 5/2004 | Okutani |
| 2004/0125889 A1 | 7/2004 | Cumeralto et al. |
| 2004/0236620 A1 | 11/2004 | Chauhan et al. |
| 2005/0017848 A1 | 1/2005 | Flen et al. |
| 2005/0023347 A1 | 2/2005 | Wetzel et al. |
| 2005/0068193 A1 | 3/2005 | Osterloch et al. |
| 2005/0119930 A1 | 6/2005 | Simon |
| 2005/0192999 A1 | 9/2005 | Cook et al. |
| 2005/0222933 A1 | 10/2005 | Wesby |
| 2005/0239414 A1 | 10/2005 | Mason et al. |
| 2005/0267898 A1 | 12/2005 | Simon et al. |
| 2007/0043849 A1 * | 2/2007 | Lill et al. | 709/224 |
| 2008/0040025 A1 | 2/2008 | Hoiness |
| 2008/0048883 A1 | 2/2008 | Boaz |

FOREIGN PATENT DOCUMENTS

| | | |
|---|---|---|
| GB | 2356475 | 5/2001 |
| WO | WO 01/35366 A1 | 5/2001 |

OTHER PUBLICATIONS

Mobile Collector 2.0 Administration Guide, Itron, Inc., Spokane, WA, 2003, pp. i-78.

BadgerMeter, Inc., "TRACE® Automated Meter Reading System, Vehicle Interactive Display (VID), Technical Brief," Milwaukee, WI, Jun. 2002, 1 page.

BadgerMeter, Inc., "TRACE® automated Meter Reading System, Operation Brief," Milwaukee, WI, Dec. 2001, 2 pages.

BadgerMeter, Inc., "TRACE® Automated Meter Reading System, Model MMi Mini Mobile Interrogator, Technical Brief," Milwaukee, WI, Dec. 2001, 2 pages.

AMCO Automated Systems, LLC, "Vehicular Interactive Display (a Mini Mobile Interrogator option)," Scott Depot, WV, Sep. 2002, 2 pages.

AMCO Automated Systems, LLC, "Trace Automated Meter Reading Systems, TRACE™—mobile AMR system," Scott Depot, WV, Apr. 2003, 2 pages.

"Magellan RoadMate 700 (North America)," Thales Navigation, Inc., 2004 http://www.magellangps.com/en/products/product.asp-?PRODID=955, 3 pages, Internet access on Oct. 27, 2004.

LookSmart's FindArticles, "BC Gas Selects Utility Partners' MobileUP Solution for Workforce Automation," Business Wire, Jun. 19, 2000, pp. 1-2, http://www.findarticles.com/p/articles/mi_m0EIN/is_2000_June_19/ai_62815236/print, [Accessed Oct. 21, 2004].

DB Microware, "DB Microware Wins 2004 iAnywhere Innovator Award," DB Microware Fieldnet Family, 2001, pp. 1-2, http://www.dbmicro.com/Fieldnet.htm [Accessed Oct. 21, 2004].

International Search Report dated Apr. 5, 2001 for PCT International Application No. PCT/US2000/041568, 2 pages.

International Search Report dated Jun. 3, 2004 for PCT International Application No. PCT/US2003/027739.

GlobalSecurity.org, "Electrical Distribution System Overview", http://www.globalsecurity.org/security/intro/power.htm, 6 pages.

* cited by examiner

Message Type ID: 0x01

Consumption

| 0 | Decode Type |
|---|---|
| 1 | Consumption_1_HI |
| 2 | Consumption_1 |
| 3 | Consumption_1 |
| 4 | Consumption_1_LO |

*FIG. 4A*

Message Type ID: 0x02

Consumption and Tamper Data

| 0 | Decode Type |
|---|---|
| 1 | Consumption_HI |
| 2 | Consumption |
| 3 | Consumption |
| 4 | Consumption_LO |
| 5 | Tamper_HI |
| 6 | Tamper_LO |
| 7 | Last Good Read Time_HI |
| 8 | Last Good Read Time |
| 9 | Last Good Read Time |
| 10 | Last Good Read Time_LO |

*FIG. 4B*

Message Type ID: 0x03

Interval Data

| 0 | Decode Type |
|---|---|
| 1 | Consumption_HI |
| 2 | Consumption |
| 3 | Consumption |
| 4 | Consumption_LO |
| 5 | Number of Intervals |
| 6 | Tamper_HI |
| 7 | Tamper_LO |
| 8 | Truncated_UTC_HI |
| 9 | Truncated_UTC_LO |
| 10 | Interval1_HI |
| 11 | Interval1_LO |
| 12 | Interval2_HI |
| 13 | Interval2_LO |

. .
. .
. .

| n-1 | Last_Interval_Hi |
|---|---|
| 2 | Last_Interval_LO |

*FIG. 4C*

Message Type ID: 0x04

Time of Use Data

| 0 | Decode Type |
|---|---|
| 1 | Tier_0_Consumption_HI |
| 2 | Tier_0_Consumption |
| 3 | Tier_0_Consumption |
| 4 | Tier_0_Consumption_LO |
| 5 | Tier_0_Demand_HI |
| 6 | Tier_0_Demand_LO |
| 7 | Tier_1_Consumption_HI |
| 8 | Tier_1_Consumption |
| 9 | Tier_1_Consumption |
| 10 | Tier_1_Consumption_LO |
| 11 | Tier_1_Demand_HI |
| 12 | Tier_1_Demand_LO |
| 13 | Tier_2_Consumption_HI |

. . .
. . .

| 45 | Tier_7_Consumption |
|---|---|
| 46 | Tier_7_Consumption_LO |
| 47 | Tier_7_Demand_HI |
| 48 | Tier_7_Demand_LO |
| 49 | Time_Remain_In_Tier_HI |
| 50 | Time_Remain_In_Tier_LO |
| 51 | TOU_Flags |

TOU Flags:

| R | R | R | CTR | CTR | CTR | SEA | SEA |
|---|---|---|---|---|---|---|---|
| MSB | | | | | | | LSB |

R: Reserved

CTR: Current Tier.
This field identifies which tier (0-7) the device is metering at the time of read.

SEA: Season Flags
This utility-programmable field indicates current season.

*FIG. 4D*

Message Type ID: 0x06

Multiple Encoder Consumption

| 0 | Decode Type 1 |
|---|---|
| 1 | Consumption_1_HI |
| 2 | Consumption_1 |
| 3 | Consumption_1 |
| 4 | Consumption_1_LO |
| 5 | Decode Type 2 |
| 6 | Consumption_2_HI |
| 7 | Consumption_2 |
| 8 | Consumption_2 |
| 9 | Consumption_2_LO |

· ·
· ·

| L-1 | Consumption_n |
|---|---|
| L | Consumption_n_LO |

*FIG. 4E*

Message Type ID: 0x09

Multiple Daily Read Data

| 0 | Decode_Type |
|---|---|
| 1 | Consumption_HI |
| 2 | Consumption |
| 3 | Consumption |
| 4 | Consumption_LO |
| 5 | Last Daily Read Time_HI |
| 6 | Last Daily Read Time |
| 7 | Last Daily Read Time |
| 8 | Last Daily Read Time_LO |
| 9 | Daily_Read_Index |
| 10 | Daily_Read_Data |
| • | • |
| • | • |
| L-1 | Daily_Read_Data |
| L | Daily_Read_Data |

*FIG. 4F*

Message Type ID: 0x11

Repeated IDM Report

| | | | | | | |
|---|---|---|---|---|---|---|
| 0 | Protocol ID (1Ch) | 29 | Packed Differential Consumption | 58 | Packed Differential Consumption |
| 1 | Length | 30 | Packed Differential Consumption | 59 | Packed Differential Consumption |
| 2 | Length | 31 | Packed Differential Consumption | 60 | Packed Differential Consumption |
| 3 | Application Version | 32 | Packed Differential Consumption | 61 | Packed Differential Consumption |
| 4 | ERT Type | 33 | Packed Differential Consumption | 62 | Packed Differential Consumption |
| 5 | ERT Serial Number (MSB) | 34 | Packed Differential Consumption | 63 | Packed Differential Consumption |
| 6 | ERT Serial Number | 35 | Packed Differential Consumption | 64 | Packed Differential Consumption |
| 7 | ERT Serial Number | 36 | Packed Differential Consumption | 65 | Packed Differential Consumption |
| 8 | ERT Serial Number (LSB) | 37 | Packed Differential Consumption | 66 | Packed Differential Consumption |
| 9 | Sequence Counter | 38 | Packed Differential Consumption | 67 | Packed Differential Consumption |
| 10 | Programming State | 39 | Packed Differential Consumption | 68 | Packed Differential Consumption |
| 11 | Tamper Counters | 40 | Packed Differential Consumption | 69 | Packed Differential Consumption |
| 12 | Tamper Counters | 41 | Packed Differential Consumption | 70 | Packed Differential Consumption |
| 13 | Tamper Counters | 42 | Packed Differential Consumption | 71 | Packed Differential Consumption |
| 14 | Tamper Counters | 43 | Packed Differential Consumption | 72 | Packed Differential Consumption |
| 15 | Tamper Counters | 44 | Packed Differential Consumption | 73 | Packed Differential Consumption |
| 16 | Tamper Counters | 45 | Packed Differential Consumption | 74 | Packed Differential Consumption |
| 17 | ERT Asynchronous Counter | 46 | Packed Differential Consumption | 75 | Packed Differential Consumption |
| 18 | ERT Asynchronous Counter | 47 | Packed Differential Consumption | 76 | Packed Differential Consumption |
| 19 | Power Outage Flags | 48 | Packed Differential Consumption | 77 | Packed Differential Consumption |
| 20 | Power Outage Flags | 49 | Packed Differential Consumption | 78 | Packed Differential Consumption |
| 21 | Power Outage Flags | 50 | Packed Differential Consumption | 79 | Packed Differential Consumption |
| 22 | Power Outage Flags | 51 | Packed Differential Consumption | 80 | Packed Differential Consumption |
| 23 | Power Outage Flags | 52 | Packed Differential Consumption | 81 | Packed Differential Consumption |
| 24 | Power Outage Flags | 53 | Packed Differential Consumption | 82 | Xmit Time Offset |
| 25 | Last Consumption | 54 | Packed Differential Consumption | 83 | Xmit Time Offset |
| 26 | Last Consumption | 55 | Packed Differential Consumption | 84 | Hop Count |
| 27 | Last Consumption | 56 | Packed Differential Consumption | 85 | RSSI MSB |
| 28 | Last Consumption | 57 | Packed Differential Consumption | 86 | RSSI LSB |
| | | | | 87 | Tick Counter MSB |
| | | | | 88 | Tick Counter LSB |

*FIG. 4G*

Message Type ID: 0x50

Outage Report (Alarm Message)

| 0 | Outage Count |
|---|---|

FIG. 4H

Message Type ID: 0x51

Restoration Report (Alarm Message)

| 0 | Outage Count |
|---|---|
| 1 | Restoration Time Count |

FIG. 4I

Message Type ID: 0x52

Repeated Outage Report (Alarm Message)

| 0 | Device ID of Meter Type |
|---|---|
| 1 | Meter SN MSB |
| 2 | Meter SN |
| 3 | Meter SN |
| 4 | Meter SN LSB |
| 5 | Outage Count |
| 6 | Hop Count |
| 7 | Tick Counter MSB |
| 8 | Tick Counter LSB |

*FIG. 4J*

Message Type ID: 0x53

Repeated Restoration Report (Alarm Message)

| 0 | Device ID of Meter Type |
|---|---|
| 1 | Meter SN MSB |
| 2 | Meter SN |
| 3 | Meter SN |
| 4 | Meter SN LSB |
| 5 | Outage Count |
| 6 | Restoration Time Count |
| 7 | Hop Count |
| 8 | Tick Counter MSB |
| 9 | Tick Counter LSB |

*FIG. 4K*

Message Type ID: 0x54

Repeater Outage Report (Alarm Message)

| 0 | Outage Count |
|---|---|
| 1 | Hop Count |
| 2 | Tick Counter MSB |
| 3 | Tick Counter LSB |

*FIG. 4L*

Message Type ID: 0x55

Repeater Restoration Report (Alarm Message)

| 0 | Outage Count |
|---|---|
| 1 | Restoration Time Count |
| 2 | Hop Count |
| 3 | Tick Counter MSB |
| 4 | Tick Counter LSB |

*FIG. 4M*

Message Type ID: 0xCC

Endpoint RSSI Report from Repeater

| 0 | ERT Type |
|---|---|
| 1 | ERT Serial Number (MSB) |
| 2 | ERT Serial Number |
| 3 | ERT Serial Number |
| 4 | ERT Serial Number (LSB) |
| 5 | Hop Count |
| 6 | RSSI MSB |
| 7 | RSSI MSB |

*FIG. 4N*

| Bit Position | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Mask Bits | 0 | 0 | 0 | 0 | 0 | 0 | 0 | 0 | 0 | 0 | 1 | 0 | 1 | 0 | 0 | 0 |

VERSATILE RADIO PACKETING FOR AUTOMATIC METER READING SYSTEMS

CLAIM TO PRIORITY

This application claims the benefit of U.S. Provisional Application No. 60/764,823, entitled "OUTAGE NOTIFICATION, SUCH AS FIXED NETWORK POSITIVE OUTAGE NOTIFICATION," filed on Feb. 3, 2006; U.S. Provisional Application No. 60/771,829, entitled "AUTOMATED UTILITY METER READING SYSTEM WITH MESSAGE-TYPE FILTER," filed on Feb. 9, 2006; and U.S. Provisional Application No. 60/788,653, entitled "VERSATILE RADIO PACKET COMPATIBLE WITH EXISTING AUTOMATIC READING SYSTEMS," filed on Apr. 3, 2006, all of which are incorporated by reference herein in their entirety.

CROSS REFERENCE TO RELATED APPLICATIONS

This application is related to U.S. patent application Ser. No. 11/702,435, entitled "OUTAGE NOTIFICATION, SUCH AS FIXED NETWORK POSITIVE OUTAGE NOTIFIATION," filed concurrently herewith, which is incorporated herein by reference in its entirety.

FIELD OF THE INVENTION

The present invention relates generally to automatic utility meter reading (AMR) and, more particularly, to systems, methods and data structures for communicating and responding to radio packets in AMR systems.

BACKGROUND OF THE INVENTION

Automatic meter reading (AMR) systems are generally known in the art. Utility companies, for example, use AMR systems to read and monitor customer meters remotely, typically using radio frequency (RF) communication. AMR systems are favored by utility companies and others who use them because they increase the efficiency and accuracy of collecting readings and managing customer billing. For example, utilizing an AMR system for the monthly reading of residential gas, electric, or water meters eliminates the need for a utility employee to physically enter each residence or business where a meter is located to transcribe a meter reading by hand.

There are several different ways in which current AMR systems are configured, including fixed network and mobile network systems. In a fixed network, such as described in U.S. Pat. No. 5,914,673 to Jennings et al., incorporated by reference herein in its entirety, encoder-receiver-transmitter (ERT)-type endpoint devices at meter locations communicate with readers that collect readings and data using RF communication. There may be multiple fixed intermediate readers located throughout a larger geographic area on utility poles, for example, with each endpoint device associated with a particular reader and each reader in turn communicating with a central system. Other fixed systems can utilize a system including repeaters or relay devices that expand the coverage area for each reader, cell control units (CCUs) that concentrate data and forward the same on to the system head end using a wide area network (WAN) or other suitable communication infrastructure. In simple fixed systems, only one central reader may be utilized with all of the endpoint devices. In a mobile network AMR environment, a handheld, vehicle-mounted, or otherwise mobile reader device with RF communication capabilities is used to collect data from endpoint devices as the mobile reader is moved from place to place.

U.S. Pat. No. 5,918,380 to Schleich et al., incorporated by reference herein in its entirety, discloses a metering system for metering the consumption of electrical energy that includes an ERT-type endpoint device for transmitting a RF signal and a receiver device for receiving the radio frequency signal transmitted by the endpoint device. Time interval consumption messaging is also described, in which a single packet transmission can include data representing multiple meter readings as a function of time. U.S. Pat. No. 4,799,059, incorporated by reference herein in its entirety, discloses an example of a signaling protocol for an ERT packet.

Utility meter endpoints associated with water and gas meters are typically battery-powered, and consequently have a finite amount of energy available for their service life. Because a service life for these endpoints of 10-20 years or more is desirable to reduce the expense of battery replacement, energy conservation is a major design criterion. Packet transmission and reception accounts for a substantial portion of the energy demands for endpoints. Longer and more frequent packet transmissions naturally require more energy.

Even in the case of electrical meter endpoints, which generally have the electrical mains available as a power source, energy conservation related to communications is desirable. For example, during power outages, it would be desirable for electrical meter endpoints to notify the AMR system of their loss of power. One problem associated with providing this outage notification function is the small amount of energy typically stored in the electrical endpoint limits the amount of communication attempts that can be carried out.

A related design criterion for utility meter endpoints is the need for keeping their cost low. Utility providers, which tend to be cost sensitive when making capital expenditures, must still maintain large quantities of endpoints for monitoring utility consumption at each of their many customers. For commercial and industrial customers, multiple endpoints are often needed at certain facilities. When selecting from among competing AMR system suppliers, equipment and infrastructure cost is a major consideration. Energy storage components (such as batteries and large capacitors) are a significant cost item for endpoints, so it is desirable to keep the capacity (and the corresponding cost) of these components to a minimum.

Another important design criterion for new endpoints is the need to support existing AMR infrastructure. Presently, for example, AMR infrastructure exists for reading some 40 million ERT endpoints of the type manufactured by Itron, Inc. of Liberty Lake, Wash. For next-generation utility meter endpoints, recent advances in technologies such as event recognition, increased processing power and data storage capability, and the like, can enable many new and useful features and functionality. For example, modern endpoints can provide time of use (TOU) data, interval consumption data, endpoint status information, telemetry data, and utility supply problem reporting. However, implementing these, and other new features and functions in new endpoints is complicated by the need to overhaul or upgrade the existing AMR infrastructure to support the new endpoint technology.

For instance, many existing fixed and mobile readers that communicate with existing ERTs have limited computing power for detecting various types of packet transmissions. In these receivers, the radio is able to correlate on bit sequences to detect two types of ERT packets, the relatively shorter standard consumption message (SCM) transmitted by mostly older ERT devices, and the interval daily message (IDM)

transmitted by the newer endpoint devices in the field. The SCM packets have been used with a fixed length of 96 bits, whereas IDM packets have been used with a fixed length of 92 bytes. Each of these packet types has been used with a rigidly-defined length, structure, and set of field definitions.

While the SCM and IDM message formats are well-suited for many purposes, neither the SCM nor the IDM packet is well-suited for carrying varying types of information. The SCM packet has a very small payload portion, so only very simple information items can be carried in a single SCM packet. By contrast, the IDM packet is quite large, such that the IDM packet format would be inefficient or unwieldy for carrying smaller or medium-length information items.

AMR systems that are currently available are generally one-way, one-and-a-half-way, or two-way systems. In a traditional one-way system, such as the system that uses ubiquitous ERT device, each ERT periodically turns on, or "bubbles up," to send data to a receiver. One-and-a-half-way describes systems in which a receiver sends a wake-up signal to an endpoint device, which in turn responds by sending utility meter reading data to a receiver. Existing ERT-based AMR systems are either one-way or one-and-one-half-way systems.

Two-way AMR systems are systems in which command and control communications are sent and received between AMR system readers and endpoint devices. One type of AMR system, such as the Water Fixed Network 2.5, or the 433 OMR or 433 Fixed Network manufactured by Itron Inc., supports two-way operation. In this type of system, endpoint devices communicate with fixed or mobile AMR readers, typically, in the 1430 MHz telemetry band using FM modulation. SCM and IDM packets are not used in these non-SCM-based AMR systems. Instead, a different set of consumption and command and control packets, which are most often substantially longer than IDM packets, are used to transport large amounts of consumption data and two-way communications.

Two-way communications have not been widely used in the ERT-based AMR systems. The longer packet formats utilized in the endpoint-based AMR systems are not supported by many existing radios designed for receiving the relatively shorter SCM and IDM packets. Additionally, utilizing multiple different packet types presents a system upgradeability problem for existing ERT-based AMR infrastructure, as existing readers lack the processing power to recognize more than two or three distinct packet types. A practical approach has not yet been proposed for enabling two-way communications in ERT-type AMR systems, and for enabling the use of packet types that are longer than SCM packets but shorter than the existing IDM packets, without major overhaul of the presently-installed legacy devices in the existing ERT-based AMR infrastructure.

SUMMARY OF THE INVENTION

One aspect of the present invention is directed to an automatic meter reading (AMR) system that utilizes versatile radio packets. Versatile radio packets are recognizable by conventional (i.e., legacy) AMR system receivers that are capable of receiving conventional interval data message (IDM) packets. For purposes of the present invention, the term "recognizable" in this instance means that the conventional receivers are presently able to detect versatile packets, or can relatively easily be upgraded (e.g. by reprogramming) to be able to detect the versatile radio packets. Versatile radio packets are versatile in the sense that the packets are capable of carrying a wide variety of information items of various lengths. For example, versatile radio packets can carry consumption information including the present consumption value and interval data representing a set of past consumption values (which is a relatively long message), or they can carry an alarm message indicating a service outage (which is a relatively short message). Versatile radio packets can enable endpoint and other devices in the AMR system to transmit a variety of new information to existing AMR infrastructure without having to conduct a significant infrastructure overhaul.

In one embodiment, a versatile radio packet includes a packet preamble portion, a packet body portion, and a packet validation portion. The packet preamble portion has a frame synchronization bit sequence that is recognizable by existing or conventional encoder-receiver-transmitter (ERT)-based AMR system receivers, such bit sequence 0x16A3. For purposes of the present invention, the term "recognizable" in this instance means that the conventional receivers are presently able to detect versatile packets, or can relatively easily be upgraded (e.g. by reprogramming) to be able to detect the versatile radio packets. The packet preamble portion also has a packet type identifier field and a packet length field. The packet body portion includes at least an endpoint serial number field and a message. At least the message has a variable length. Optionally, the message includes a message type identifier field and a message value field that can have a plurality of sub-fields. The message can include data originating from an endpoint or from an intermediate AMR system device such as a repeater.

A method of receiving a versatile radio packet according to one aspect of the invention includes the steps of monitoring the communication channel for a transmission of a bit sequence that substantially includes a frame synchronization sequence having a value of 0x16A3, buffering incoming data over the communication channel, and processing a 1-byte packet type ID field that immediately follows the frame synchronization sequence. According to the method, in response to detecting of the frame synchronization sequence and a packet type ID field having a value corresponding to a versatile radio packet, the following versatile radio packet fields are processed: a packet length field that immediately follows the packet ID field, a message type identifier field that immediately follows the length field, an endpoint ID field that immediately follows the message type ID field, a serial number field that immediately follows the endpoint ID field, and a message value field having a length corresponding to a remaining packet length value represented by the packet length field. The processing results in reading items of information from the individual fields of the versatile radio packet to obtain utility meter-related data.

According to another aspect of the invention, a utility meter reader discriminates among AMR system messages from endpoint devices based on message type. In one embodiment, received versatile radio packets are filtered to relay only a subset of all received versatile radio packets. The received AMR system messages each include at least one type indicator. The reader receives type-discriminating information. The type-discriminating information may be a type-discriminating instruction, or simply data representing type differences. The type-discriminating information may be received from the processing center, or elsewhere. The type-discriminating instruction may be a bit mask, or may be in another suitable form that is otherwise indicative of a type of data to be relayed (or not relayed) to the processing center. The reader identifies a first item of utility meter data to be relayed to the processing center based on the received type-discriminating information, and then relays the first item of utility meter data to the processing center. The type-discriminating instruction may provide logic that enables the reader to identify the message types to relay or not to relay from among multiple type indicators.

BRIEF DESCRIPTION OF THE DRAWINGS

FIGS. 4A-4N illustrate various examples of messages that can be carried by the versatile radio packet of FIG. 3.

Figure 1A:
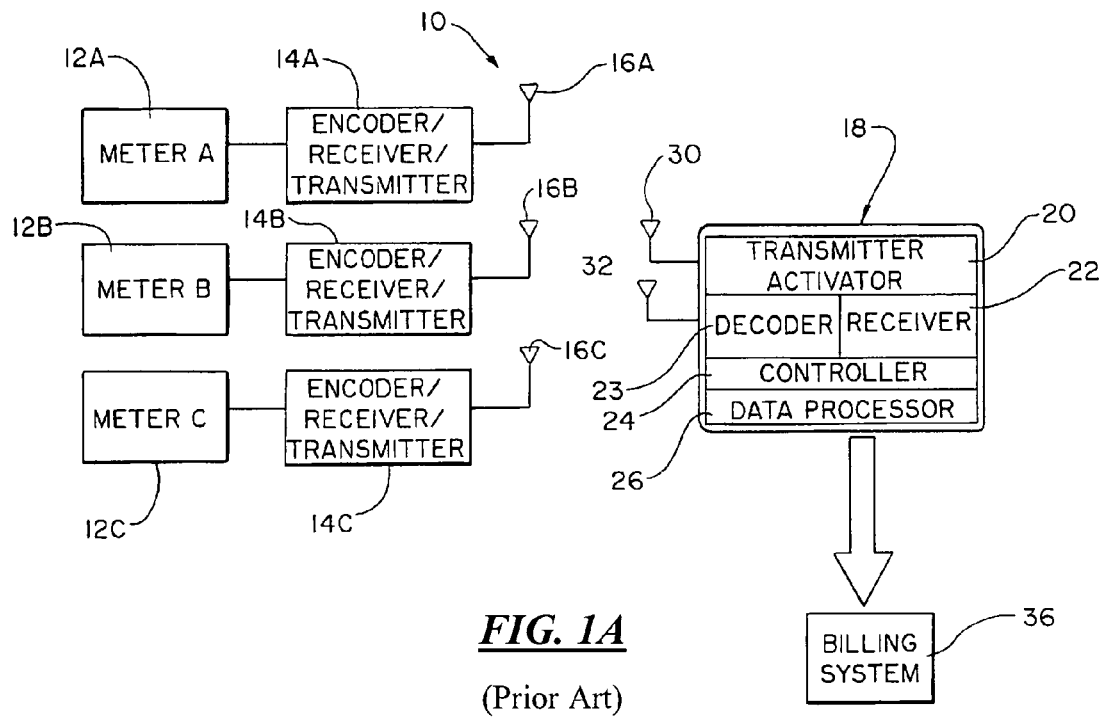
FIG. 1A is a diagram illustrating an example of a conventional ERT-based AMR system arrangement.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1A is a diagram illustrating a portion of a typical automatic meter reading (AMR) system. As shown, automatic/remote AMR system 10 is adapted for use with a plurality of remotely located consumption sensing instruments such as meters 12A-12C. Meters 12A-12C sense or monitor a physical parameter, such as a quantity of a given commodity (e.g. electrical power, gas, water) used by a residential or business customer. The meters 12A-12C are also capable of sensing critical events, such as unauthorized tampering, certain malfunctions, and power outages (in the case where the meters 12A-12C sense are sensing electric power consumption).

Associated with and operatively coupled to each meter 12A-12C is an endpoint 14A-14C (generally referred to as endpoint 14). Endpoints 14A-14C all function in a similar manner, and are typically identical to facilitate high volume, low cost construction. In one embodiment, endpoints 14 are each an ERT-type device that is capable of operating with existing ERT-based AMR systems. Each endpoint 14 has a meter interface and a radio transmitter, and includes an antenna 16A-16C, coupled respectively to the associated radio transmitter, for transmitting and optionally receiving radio frequency (RF) signals as well as a processor, including a random access memory (RAM), a non-volatile memory such as an EEPROM, and a simple power supply.

Figure 1B:
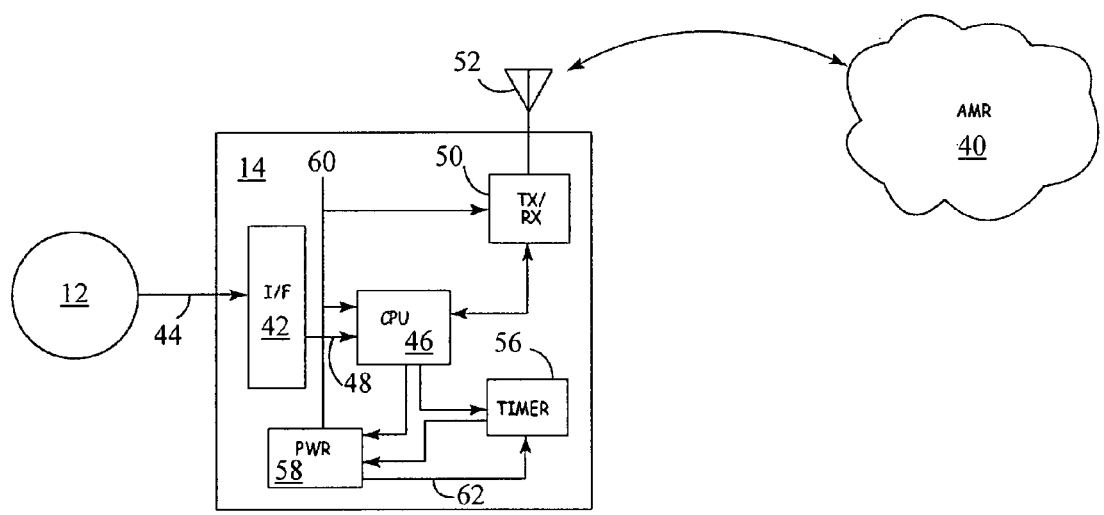
FIG. 1B is a diagram illustrating the components of a conventional ERT device.

FIG. 1B illustrates in greater detail one embodiment of an endpoint 14. Endpoint 14 interfaces with a utility meter 12, receives consumption and other relevant data from utility meter 12, and communicates the data to AMR system 40. Endpoint 14 includes an interface system 42, which operatively couples to utility meter 12 via coupling 44. In one embodiment, coupling 44 includes electrical and mechanical components for making a physical and electrical connection between utility meter 12 and endpoint 14. For example, coupling 44 can include an encoder that converts the utility meter 12 measurement into a digital representation that is readable by a processor 46. Interface system 42 is interfaced with processor 46 via interface 48. In one embodiment, interface 48 includes a portion of a data bus and of an address bus.

In this example embodiment, processor 46 executes instructions that control the operation of endpoint 14. In one embodiment, processor 46 includes a microprocessor-type system that has memory, an instruction processing core, and input/output circuits. Processor 46 interfaces with radio 50, which is then coupled to an antenna 52. In one embodiment, radio 50 is a transceiver; in another embodiment, radio 50 is a receiver only. In operation, interface hardware 42 forwards and converts utility meter data for further processing by processor 46. Processor 46 processes and stores the data at least temporarily, converts at least a portion of the utility meter or related data into packets, and instructs transceiver 50 to communicate to AMR system 40 at appropriate times. Consumption data, as well as other account information such as identification data identifying utility meter 12 from which the consumption data was sensed, is encoded for transmission (i.e. packetized) in an RF endpoint signal by processor 46 when endpoint 14 is externally activated by AMR system 40 (e.g. polled) or self-activated (e.g. one-way bubble-up operation).

In one exemplary embodiment, endpoint 14 operates in a low-power standby mode during a majority (>50%) of the time. While in the standby mode, interface system 42, processor 46, and transceiver 50 are effectively shut down to reduce power consumption. Timer 56 operates to periodically wake up the shut-down systems so that they enter into an active operating mode. In one embodiment, timer 56 is an independent circuit that is interfaced with processor 46. In another embodiment, timer 56 is implemented as a watchdog timer in a microcontroller that is a part of processor 46. In either embodiment, one feature of timer 56 is that timer 56 consumes relatively little energy for operating. Also, upon expiration of a settable time duration set into timer 56, timer 56 provides a signal that initiates bringing online the systems that are in standby mode.

According to one exemplary embodiment, endpoint 14 includes a power supply 58. In one embodiment, power supply 58 includes one or more batteries. Power supply 58 provides conditioned power to interface system 42, processor 46, and transceiver 50 via a switchable power bus 60. Power supply 58 provides conditioned power to timer 56 via a power line 62. Timer 56 provides a control signal to power supply 58 that causes power supply 58 to apply power to power bus 60. Processor 46 provides a control signal to power supply 58 that causes power supply 58 to remove power from power bus 60. In operation, beginning in a standby mode, timer 56 has been configured with a set time duration by processor 46 via a setup signal. Timer 56 monitors the passing of the time duration and, at the expiration of the time duration, timer 56 provides a signal to power supply 58 to energize power bus 60. Once power is applied via power bus 60 to processor 46, interface system 42, and transceiver 50, processor 46 begins executing a program that gathers data from utility meter 12 via interface system 42, and momentarily activates transceiver 50. Once the data gathering program is complete, processor 46 sets a time duration into timer 56 and initiates the clock while generating a timing, and generates a control signal to power down the systems that have been powered via power bus 60.

Referring again to FIG. 1A, Any of endpoints 14A-14C can be integral with their corresponding utility meter 12A-12C. In the case of electrical meters, the power supplies may not include battery-supplied backup power. Endpoints 14A-14C accumulate and digitally store consumption data and critical events sensed by meters 12A-12C, respectively. Basic endpoint devices maintain a running counter that represents the amount of consumption of the metered utility, or commodity. More advanced endpoints maintain consumption information as a function of time, such as over configured time intervals $t_A$. The $t_A$ intervals are typically selected to be rather short, for example, 1.5, 2.5 or 5.0 minutes. This manner of data logging enables time of use and demand metering, as well as facilitating a way for utility providers to recognize the occurrence of supply problems such as outages.

Figure 2:
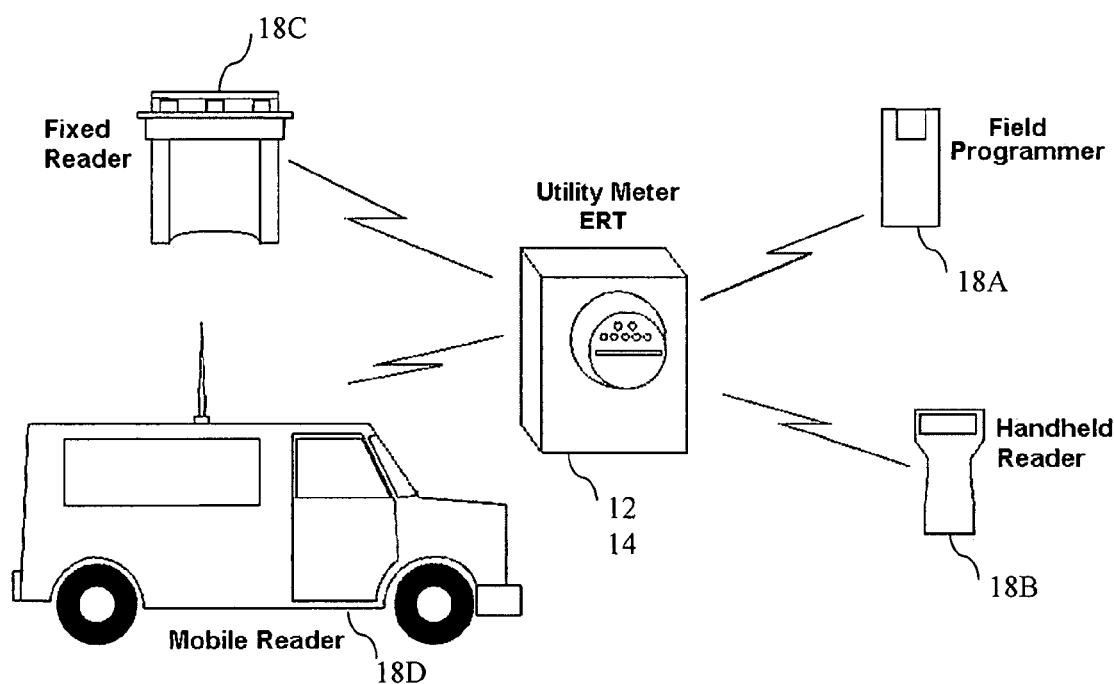
FIG. 2 is a diagram illustrating various types of conventional ERT-based AMR system receiver devices.

AMR system 10 also includes a reader 18. FIG. 2 illustrates various types of reader devices, including field programmer 18A, handheld mobile reader 18B, fixed reader 18C, and vehicle-based mobile reader 18D. Referring again for FIG. 1, an example reader 18 includes transmitter activator 20, and a receiver that includes radio receiver circuit 22, decoder 23, controller 24, and data processor 26. Transmitter activator 20 transmits RF activation signals to endpoints 14A-14C via antenna 30, while RF endpoint signals from endpoints 14A-14C are received by radio receiver circuit through antenna 32. One-and-a-half-way endpoints operate in a low-power receive mode that listens for activation signals from the AMR system. The one-and-a-half-way endpoints respond to the activation signals by entering a high-power active operating mode transmitting their consumption and related information. Other types of endpoints are one-way (transmit only) devices, and bubble up to simply transmit their consumption and related information on an internal schedule, without regard to any activation or polling signals.

For communicating with one-and-a-half-way endpoint devices, transmitter activator 20 of reader 18 generates a polling or activation signal which is transmitted through antenna 30. All endpoints 14A-14C within range of transmitter activator 30 will respond upon receipt of the activation signal through their antennas 16A-16C. Once activated, endpoints 14A-14C produce and transmit their RF endpoint signals which includes the consumption and identification data.

Whereas endpoints traditionally used in the field transmitted only one or two pre-configured messages with consumption and related information, according to one embodiment of the present invention, an endpoint 14 can respond to different polling prompts or instructions from AMR system 40 by transmitting correspondingly different information to satisfy the requests.

Each transmitted endpoint radio packet is received by radio receiver circuit 22, and the data contained therein is decoded by decoder 23 to convert the received data into a form readable by data processor 26. This data is then further processed and stored by data processor 26 under the control of controller 24. Based on the type of receiver device 18, the consumption, identification, account information, and other consumption and related information is transferred to a utility billing system 36. This transfer can take place very soon after receipt of the endpoint packet (such as where the receiver device 18 operates as a repeater), or later (such as where the reader 18 operates as a data collection and storage device).

The endpoint consumption and related information is packaged in a radio packet for transmission. Presently, interrogator/receiver units, such as interrogator reader 18, can recognize SCM and IDM packets. Table 1 below describes the structure a typical SCM packet used for communicating a single consumption reading and some associated data. Twenty four bits are available to represent a small amount of consumption data (such as the most recent consumption count). One example of an endpoint packet used by conventional ERT devices is described in detail in U.S. Pat. No. 4,799,059, which is incorporated by reference herein in its entirety.

TABLE 1

SCM Packet Format

| BIT Content | Number of Bits | Fixed Value |
|---|---|---|
| Sync Bit (MSB) | 1 | 1 |
| Preamble | 20 | 0xF2A60 |
| ERT ID MS BITs | 2 | — |
| Reserved * | 1 | — |
| Physical Tamper | 2 | — |
| ERT Type | 4 | — |
| Encoder Tamper | 2 | — |
| Consumption Data | 24 | — |
| ERT ID LS BITs | 24 | — |
| CRC Checksum (LSB) | 16 | — |

Table 2 below describes the structure of a typical IDM packet for transmitting interval consumption data. Four bytes are reserved for the most recent consumption count, and 53 bytes are used for representing differential consumption values for 47 intervals (each represented by a 9-bit field).

TABLE 2

IDM Packet Format

| BIT Content | Fixed Number of Bytes | Fixed Value |
|---|---|---|
| Training Synchronization Sequence (MSB) | 2 | 0x5555 |
| Frame Synchronization Sequence | 2 | 0x16A3 |
| Packet Type ID | 1 | 0x1C |
| Total Packet Length | 2 | 0x5CC6 |
| Application Version | 1 | 0x01 |
| ERT Type | 1 | 0x17 |
| ERT Serial Number | 4 | — |
| Consumption Interval Counter | 1 | — |
| Module Programming State | 1 | — |
| Tamper Counters | 6 | — |
| Asynchronous Counters | 2 | — |
| Power Outage Flags | 6 | — |
| Last Consumption Count | 4 | — |

| BIT Content | Fixed Number of Bytes | Fixed Value |
|---|---|---|
| Differential Consumption Intervals | 53 | — |
| Transmit Time Offset | 2 | — |
| Serial Number CRC | 2 | — |
| Packet CRC (LSB) | 2 | — |

The IDM packet format shown in Table 2 is specifically suited for reporting current consumption and interval consumption information and other ERT status information. However, the IDM packet structure is fairly rigid in terms of adaptability for carrying other types of information about the ERT. An example of the use of the IDM packet format is described in detail in U.S. Pat. No. 5,918,380, which is incorporated by reference herein in its entirety.

Versatile Packet

Figure 3:
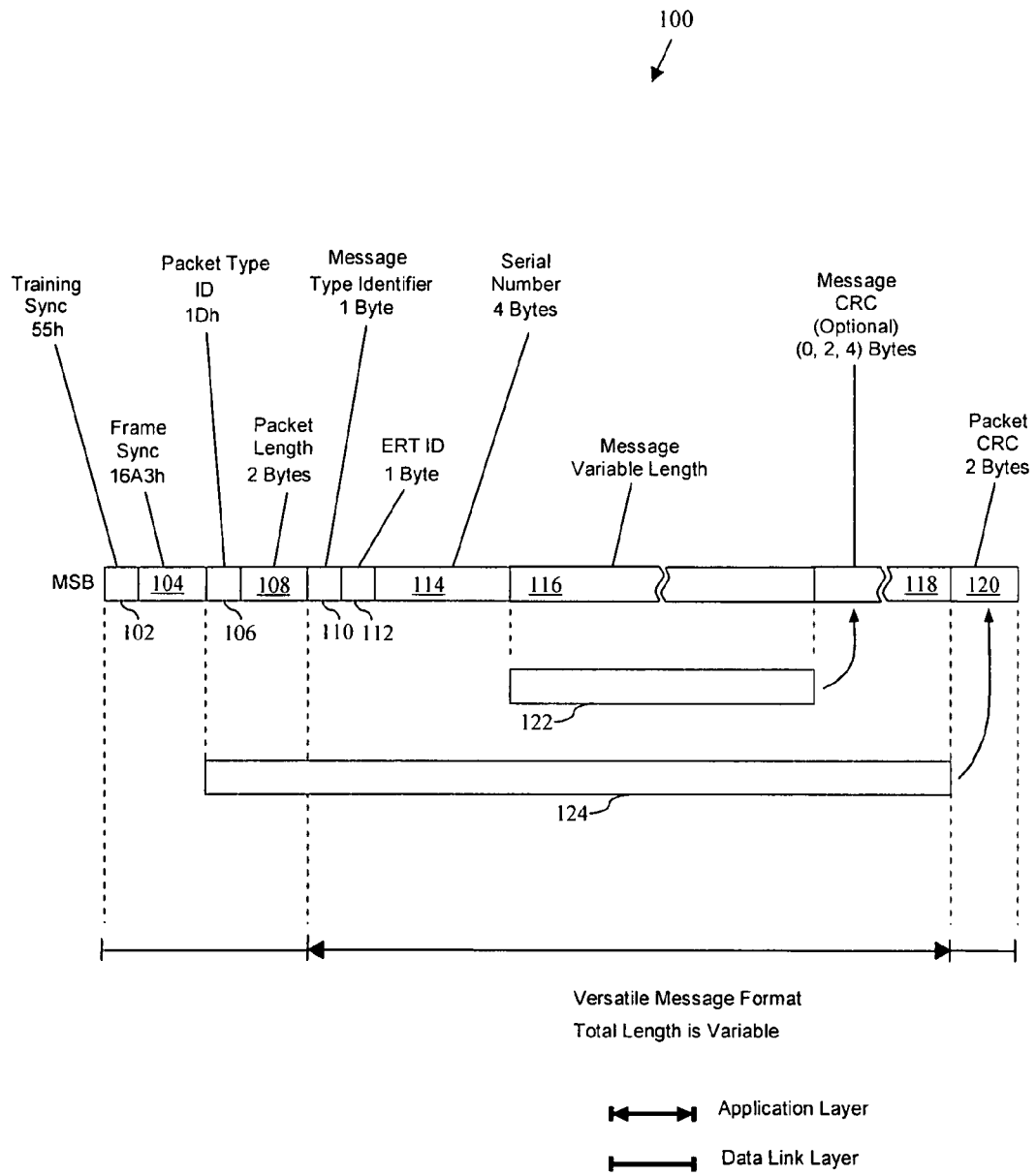
FIG. 3 is a diagram illustrating a versatile radio packet according to one aspect of the invention.

FIG. 3 is a diagram illustrating a versatile packet 100 according to one embodiment of the present invention. The first portion of versatile packet 100 resembles a corresponding portion of the IDM packet described above, which enables receivers capable of detecting the IDM packet to also detect versatile packet 100. Taken together fields 102, 104, 106, and 108 constitute the preamble portion of versatile packet 100, which is part of the data link layer responsible for providing essential information to the receiver for identifying the packet transmission, recognizing the application layer fields, and detecting and correcting any bit errors.

Field 102 of versatile packet 100 contains an alternating bit sequence of 0x55, which function as a training synchronization sequence needed by certain legacy receivers. Field 104 is a frame synchronization sequence having a value of 0x16A3. The frame synchronization sequence of field 104 (and, for some receivers, the training sequence of field 102) are used by receivers to detect the transmission of versatile packet 100.

Field 106 contains a packet type identifier having a value of 0x1D. Packet identifier field 106 is primarily useful for distinguishing versatile packet 100, from a regular IDM packet. It may be possible for certain radios to utilize the packet identifier field is used together with the frame synchronization pattern for correlation. To substantially maintain this field's usefulness for correlation, the value of 0x1D is nearly the same as the packet identifier field of the IDM packet (having a value of 0x1C), the difference being that the least significant bit is a 1 instead of a 0. Therefore, 7 out of 8 bits in packet identifier field 106 are useful for correlation. Comparing fields 102, 104, and 106 to the corresponding fields of a regular IDM packet, the 31-bit sequence 0101010100010110101000110001110 is present at or near the beginning of each packet.

Packet length field 108 of versatile packet 100 contains a value representing the remaining length of versatile packet 100. As described below, versatile packet 100 can have a widely varying length. Packet length field 108 is used by the receiver to recognize the end of the incoming packet. In one embodiment, length field 108 is used by the receiver to determine the length of a variable length field within packet 100. In a related embodiment, the packet length field 108 is used in conjunction with message type identifier field 110 (described in greater detail below) to determine the length and sub-fields within variable length message field 116 (also described in greater detail below). In one embodiment, the first byte of two-byte packet length field 108 includes a value representing the remaining length of the packet (i.e. the combined length of fields 110, 112, 114, 116, 118, and 120), and the second byte has a Hamming code corresponding to the value of the first byte. The Hamming code can be used for error detection or correction of the first byte's value.

Unlike the packet length field of the conventional IDM message described above, which contains a value representing the total packet length, packet length field 108 can be used by a variety of ERT-based AMR system receivers for determining the end of the packet transmission by virtue of its remaining length representation. Certain AMR system receivers utilize a portion of the repeating training synchronization sequence 0x5 for detecting an IDM packet transmission, while others do not use any portion of the training sequence, and instead utilize only the frame synchronization sequence 0x16A3. Other receivers may utilize only a least-significant portion of the frame synchronization sequence (or, more generally, a substantial portion of the frame synchronization sequence) for detecting (e.g., correlating on) an incoming IDM packet. Regardless of how much of the preamble needs to be received before detecting the presence of versatile packet 100, receivers can readily determine the remaining length of a detected incoming packet by reading the packet length field 108.

Fields 110, 112, 114, 116, and 118 are application layer fields, which include the information-bearing message that is the subject of the communication, as well as identifying information about the originating endpoint of the message. In one embodiment, the packet is organized into a message type identifier field 110 and a message value field 116. Message type identifier field 110, also referred to as the message number field, contains a byte representing the type of message being communicated in association with the data in message value field 116. Message value field 116 can have any suitable length, and can be further organized into message sub-fields. The data processor at the receiving end, such as data processor 26, utilizes message type identifier field 110 identify the structure of the message value field 116.

FIGS. 4A-4N illustrate various example embodiments of different message types. For each message type of in FIGS. 4A-4N, there is a different corresponding message type identifier to be transmitted in field 110 of versatile packet 100. The information depicted for each message type represents the contents of message value field 116 corresponding to the message type identifier in field 110. In each of FIGS. 4A-4N, a 2-column table represents the message value field structure of the message type depicted. Table rows represents bytes in the messages. The left-hand column of each table indicates the byte position (starting at 0), and the right-hand column describes the information represented by the corresponding byte position. Each byte position can be a complete sub-field, or a portion of a sub-field within the message body.

FIG. 4A depicts a simple 5-byte consumption message that includes four bytes of consumption information in the consumption sub-field (byte positions 1-4). FIG. 4B depicts an 11-byte consumption and tamper information message that includes consumption information, together with tamper flag states and last good read time sub-fields.

FIG. 4C illustrates an example message structure for communicating interval data. The intervals represent differential data (i.e., the change in consumption count over each time interval). The consumption corresponding to the time intervals is presented backwards in time such that Interval1 at byte position 10 represents the most recent interval.

FIGS. 4D-4F illustrate examples of message types in which the length is dependent upon a configuration. FIG. 4D depicts an example message for reporting time-of-use information used, for example, in time-of-use based billing. The length L of the time-of use message depends on the configuration of the time-of-use report format at the endpoint. FIG. 4E illustrates an example message for reporting consumption data from endpoints having multiple encoders. The length L of the multiple endpoint consumption message of FIG. 4E depends on the number of encoders associated with the endpoint. FIG. 4F illustrates an example of a multiple daily read message that reports the change in consumption over a 24-hour (or other defined) interval. The length L of this message depends on the endpoint multiple daily reading configuration.

FIG. 4G illustrates an example of a message originated by an intermediate node in the AMR system, such as a repeater. The message depicted in FIG. 4G includes consumption-related data, including interval data. Also, the message of FIG. 4G includes specific message sub-fields fields for other useful information about the AMR system performance, such as received signal strength (RSSI) information related to the transmission received by the repeater from the endpoint (bytes 85-86), and tick counter information (bytes 87-88) representing the time delay (e.g., in milliseconds) due to latency in the repeater. The Hop Count byte (byte position 84) is used by the repeater to manage multi-link hopping.

FIGS. 4H-4M illustrate examples of short messages for use in communicating alarm information. The short message format permits the alarm information to be communicated utilizing a small amount of energy for transmitting the message. The message depicted in FIG. 4H is for use by an endpoint to indicate to the AMR system that a service outage (such as an electrical power outage, for example, has occurred). The message of FIG. 4H is one byte long, and contains a value representing a counter that is incremented in response to a detection of a power outage event. In the case of an endpoint, the endpoint can utilize any suitable mechanism for detecting the outage event, such as a line monitoring circuit interfaced with the endpoint's controller. When the endpoint detects a voltage drop below a predetermined threshold, a missing AC cycle, or some other supply anomaly, the endpoint recognizes an outage condition, increments the outage counter, and transmits a versatile packet 100 with the power outage message type ID (e.g., 0x50) in message type identifier field 110 and the outage count in the message value field 116.

FIG. 4I illustrates an example of a power restoration message for transmission by an electrical endpoint in response to a detection of a restoration of power previously lost. The first byte position (byte 0) contains a count value corresponding to the most recent power outage count (which was previously transmitted in the message of FIG. 4H). The second byte position (byte 1) is a restoration count that provides information that can be used to calculate the duration of the outage. In one embodiment, the time count represents a time duration between the time of the detection of the most recent restoration and the time of the transmission of the power restoration message. The time count can represent elapsed seconds, minutes, hours, or other predefined unit of time.

With the assumption that an outage message is transmitted very shortly after a detection of the outage condition, the AMR system can recognize an approximate time of the outage based on the time of receipt of an outage message such as the outage message depicted in FIG. 4H.

The messages depicted in FIGS. 4J and 4K are examples of an outage notification message, and a restoration message, respectively, for transmission to the AMR system by an intermediate AMR node such as a repeater. These messages are used to relay outage and restoration events, as detected by a device (such as an ERT or other intermediate node) other than the node originating the message. The repeated outage notification message of FIG. 4J includes the outage count byte (in byte position 5), as received from the endpoint that detected the outage. The repeated outage notification message also includes information about the endpoint, such as meter type (byte 0) and endpoint serial number (bytes 1-4), and information useful for coordination of information in the AMR system, such as hop count (byte 6) and tick counter (bytes 7-8). The repeated restoration message of FIG. 4K has all of the fields as in the outage notification message of FIG. 4J and, in addition, includes a restoration time count byte (byte position 6) that is similar to the restoration count byte described above with reference to FIG. 4I.

FIGS. 4L and 4M illustrate examples of outage and restoration messages, respectively, representing these events as detected by the repeater. The message examples depicted in FIGS. 4L and 4M have similar corresponding fields as the messages of FIGS. 4H and 4I and, in addition, include hop count and tick counter fields. The identification of the message originating device is present in serial number field 114 of versatile packet 100.

FIG. 4N illustrates an example of a received signal strength report message, as originated by an intermediate AMR system device such as a repeater. The signal strength, as measured at the repeater is encoded at byte positions 6 and 7. Byte positions 0, and 1-4 respectively contain endpoint type and endpoint serial number information about the endpoint that transmitted the message from which the received signal strength was measured. Hop count information is included in byte position 5.

Referring again to FIG. 3, the message of versatile radio packet 100 optionally includes a message CRC field 118 that can be any suitable length. The message type identifier in field 110 represents whether, and what type of, message CRC field is included in the versatile packet 100. In one embodiment, the message CRC field has a cyclical redundancy check (CRC) code for the message value field 116, as represented at 122 in FIG. 3. Packet CRC field 120 contains a CRC code for fields 106, 108, 110, 112, 114, 116, and 118 of packet 100, as represented at 124 in FIG. 3. Message CRC field 118 and packet CRC field 120 are utilized by a receiver of packet 100 for verifying or, to the extent possible, fixing the integrity or validity of the data received in the corresponding fields.

Receiving and Processing a Versatile Packet

Figure 5:
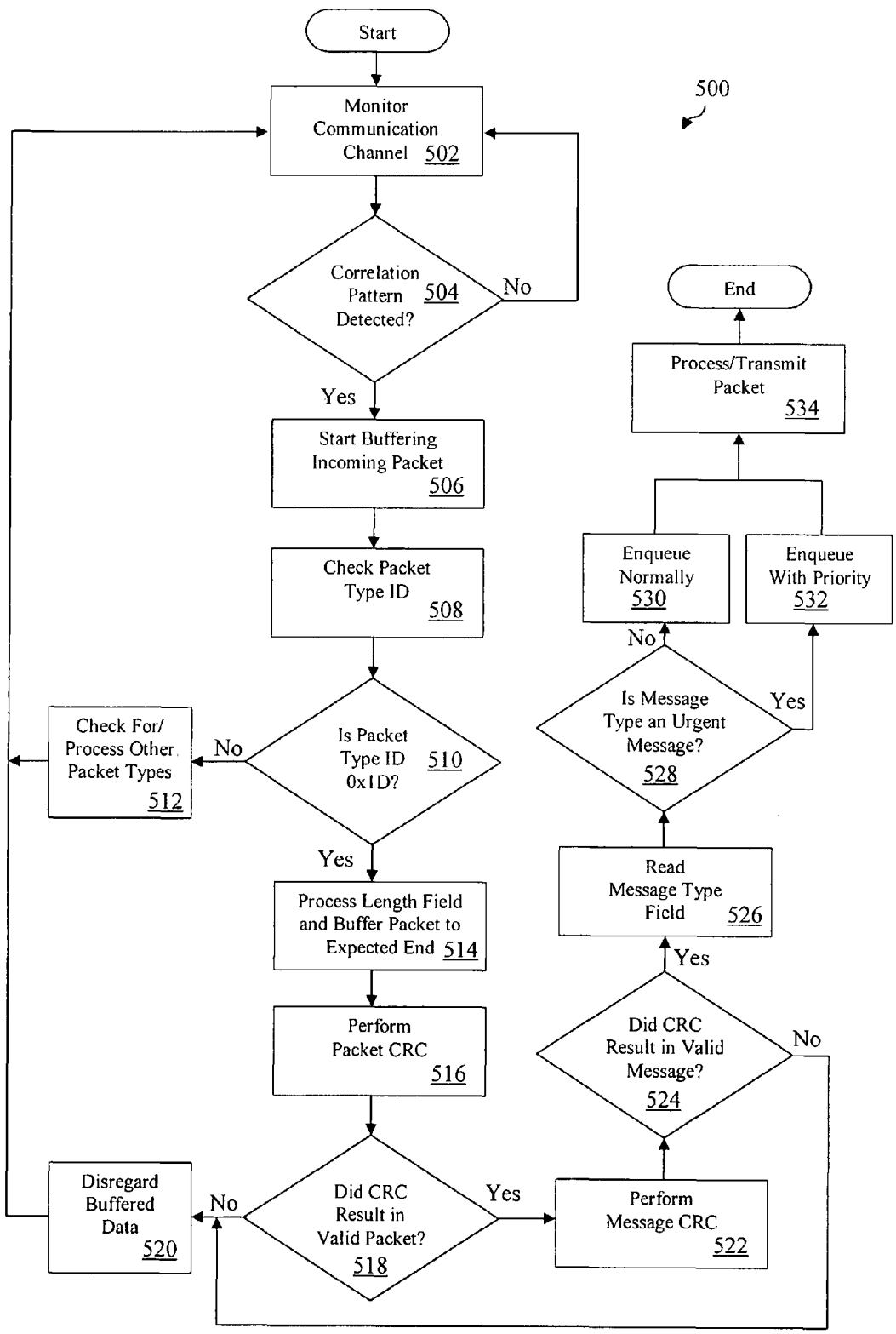
FIG. 5 is a flow diagram illustrating an example process of receiving a versatile radio packet such as the versatile radio packet of FIG. 3.

FIG. 5 is a flow diagram illustrating an example process 500 of receiving a transmission of versatile packet 100. Process 500 can be carried out by a specially-configured reader device (such as, for example, reader 18 with special instructions for carrying out process 500 executing on controller 24). In an AMR system. The specially-configured reader can be a final destination node in an AMR system, such as the head end, or an intermediate receiver, such as a repeater or a mobile reading device or field programmer. At step 502, the communication channel is monitored by a radio receiver circuit. In one embodiment, a correlator circuit is used to detect at least the frame synchronization pattern 0x16A3 of field 104. In a related embodiment, the training synchronization pattern 0x55 is also utilized in the correlation. The data immediately following the frame synchronization field 104 is the packet type ID field 106. In a related embodiment, at least a portion of packet type ID field 106 (such as several of the most significant bits) is also used for correlation.

As indicated at 504, if the correlation pattern is detected, the receiver circuit synchronizes its local clock to the incoming bit rate and begins buffering the incoming data at 506. Otherwise, the receiver continues monitoring the channel at step 502. At step 508, the packet type ID in field 106 is read by the receiver, and compared against known values. A value of 0x1D indicates that the radio packet is a versatile radio packet 100. As indicated at steps 510 and 512, if the packet type ID is other than 0x1D, then the packet type ID field 106 is compared against other known packet types, if any. At step 514, length field 108 is processed. In one embodiment, processing of length field 108 includes computing the Hamming check of the remaining packet length value. As described above, the incoming data is buffered at least until the end of the packet, as represented by length field 108.

At step 516, the receiver reads packet CRC field 120, and performs a cyclical redundancy check (CRC) of fields 106, 108, 110, 112, 114, 116, and 118 based on the CRC value in field 120. As indicated at step 518, if the result of the CRC is not a valid packet, the buffered data believed to be the packet is disregarded or discarded at step 520, and the channel monitoring of step 502 is resumed. Otherwise, if the CRC resulted in a valid packet, the receiver can continue processing the packet.

For packets that have message CRC field 118, optionally, the receiver can perform a CRC on the message field, as indicated at step 522. If the message is not valid and cannot be corrected, further processing and/or transmission can be avoided. Accordingly, at step 524, for invalid messages, the data is disregarded at step 520. For valid messages, processing can continue.

Preferential Treatment of Messages

In one embodiment, certain AMR receiving devices can give priority to certain types of messages, such as alarm messages. In intermediate AMR devices such as repeaters and CCUs, received messages can be enqueued for further transmission. Similarly, at the head end, received messages can be stored in memory in a certain order prior to processing. Typically, messages are processed or transmitted in order of their arrival. However, the ordering can be varied to improve overall system performance. Steps 526, 528, 530, 532, and 534 depict an example process portion in which different message types are given different priority. At step 526, the message type identifier field 110 is read, and at step 528 the receiver determines whether the message type is urgent. If it is not urgent, the packet is handled normally (as indicated at step 530) such as, for example, being placed at the bottom of a queue. For urgent messages, as indicated at step 534, each corresponding packet is handled with priority, such as, for example, being placed at the top of the queue. Eventually, the packet is processed (i.e. at the head end) or re-transmitted (i.e. by a repeater device) at step 536. At the head end, the endpoint information of fields 112 and 114 is extracted and associated with the message type identifier and message value. At a repeater, the application layer fields or the entire packet can be re-packaged in a new packet and transmitted to the next hop. Processing of the various fields of versatile packet 100 generally takes place at the application layer of the AMR receiver devices or head end, and generally involves decoding the individual fields and sub-fields, and applying sets of logical rules in response to the information content of each field.

Message Type Filtering

Exemplary methods and apparatus are described below for filtering out specific message types and reducing the data flow to a host processor in an AMR system with multi-channel readers that generate large amounts of data when reading large populations of endpoints. Disclosed methods eliminate unwanted data traffic and increase system performance. Presented methods can also allow identification of malfunctioning meter units in preparation for their repair or replacement.

Figure 6:
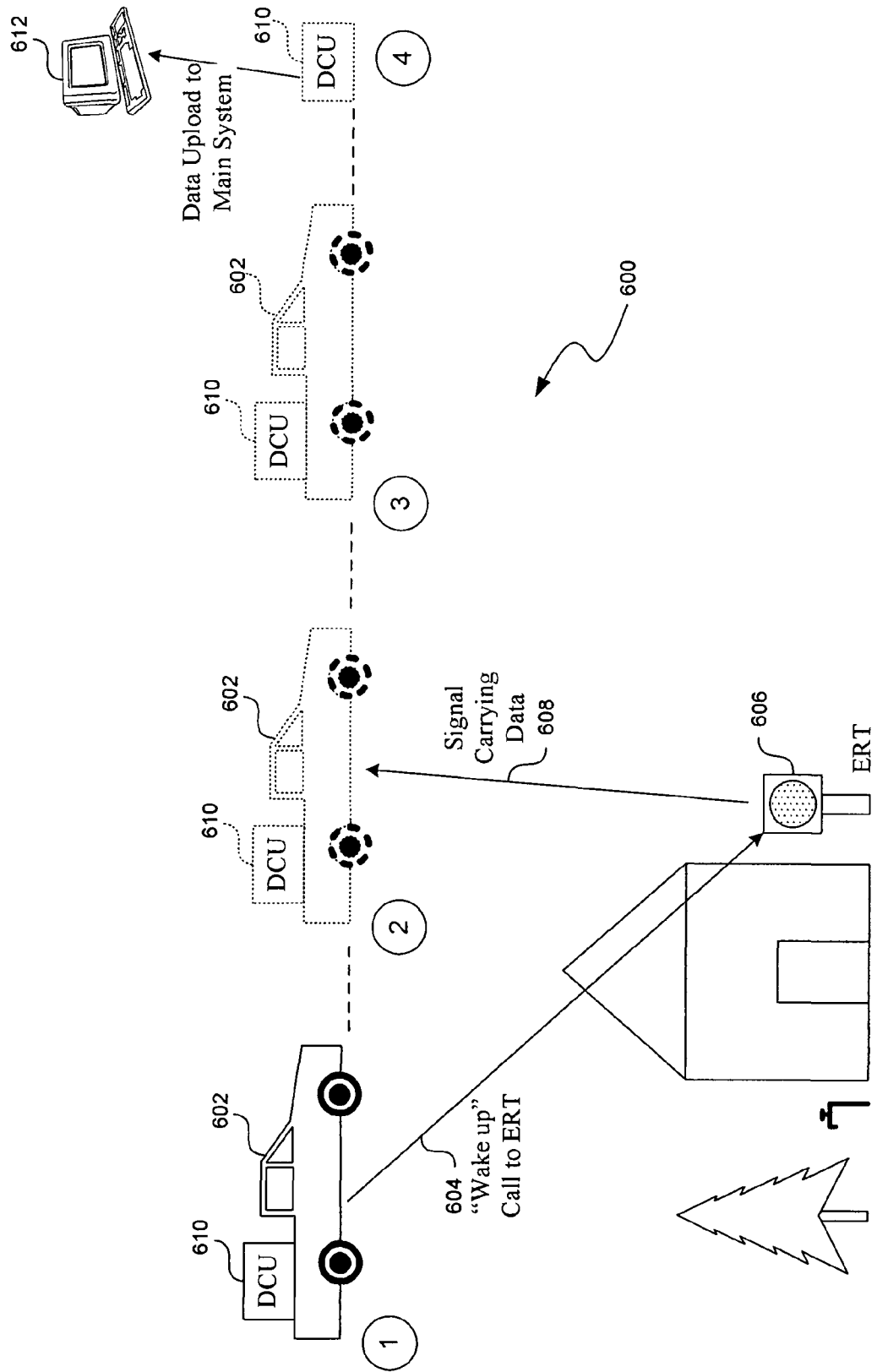
FIG. 6 is a diagram illustrating a set of basic elements and processes of a mobile AMR system incorporating aspects of the invention to facilitate filtering based on message type.

FIG. 6 illustrates an example set of elements and processes of an example mobile AMR system using 1.5-way communications. As illustrated in FIG. 6, a passing data-collecting vehicle 602 first sends a wake-up signal 604 to each endpoint, such as endpoint 606. Upon the receipt of the wake-up call 604, each endpoint transmits the required information 608, which is subsequently received by a DCU 610 (Data Collection Unit) reader of the passing vehicle 602. Afterward, the received endpoint signal goes through several signal-processing steps and the embedded data is retrieved from it. Finally, the retrieved data may be uploaded from the DCU 610 to a main system or computer 612 in a central location for billing and other purposes.

Data flow to the host processor may be reduced by filtering out specific message types transferred from endpoints to DCUs. While Multi-channel DCUs generate large amounts of data when reading large populations of endpoints, discriminating data by selecting the message type allows the host processor to receive data of desired type(s) and to reduce the amount of data transferred from the DCUs to the host. These advantages may also be availed of in the fixed AMR systems described above, and in 1-way or 2-way systems.

Currently, systems using channelized receivers have to increase the communications channel speed to the host so that the data can get through. This solution has practical limitations, one of which is that the standard PCs can handle a maximum of 115200 baud.

In an embodiment of the invention the host processor can request from the DCUs certain message types such as a type-2 gas ERT, or a type-5 electric ERT. In another embodiment multiple types of endpoints can be selected by the host processor. Today, ERT SCMs, for example, each have 16 different message types, as denoted by a four bit field in the SCM. In these embodiments the host processor passes a bit mask consisting of 16 bits. Each bit location corresponds to an endpoint type. For example, location 1 is type-1, location 2 is type-2, and so on. If a bit is set, then the reader will only pass the endpoint type associated with that bit(s).

Figures 7, 8:
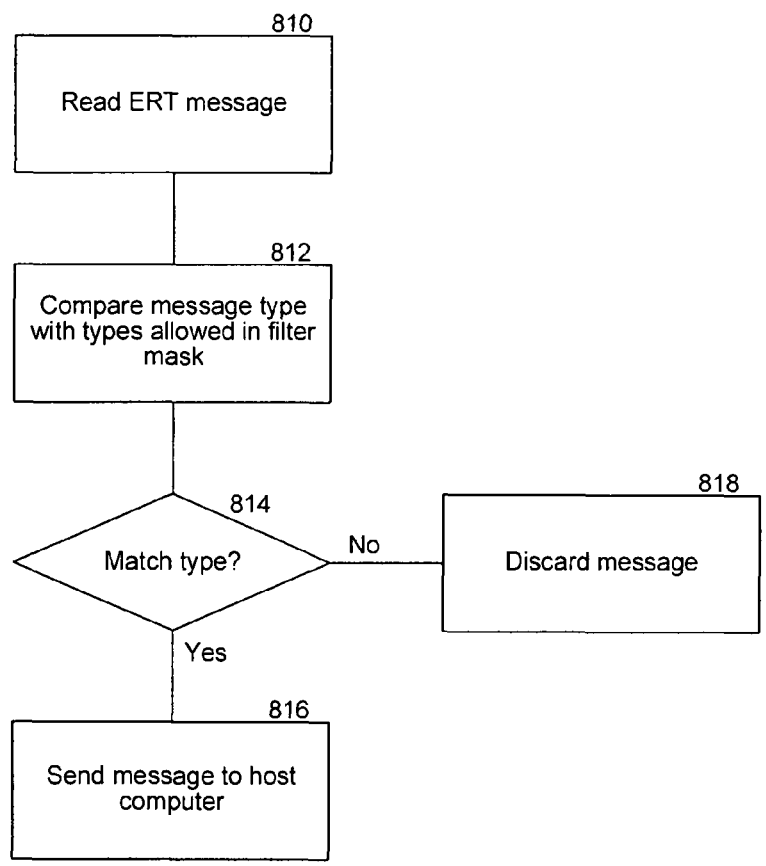
FIG. 7 illustrates a host processor 16 bit type mask according to one embodiment.
FIG. 8 illustrates a simplified flow diagram of a type filter according to one embodiment.
Figure 8B:
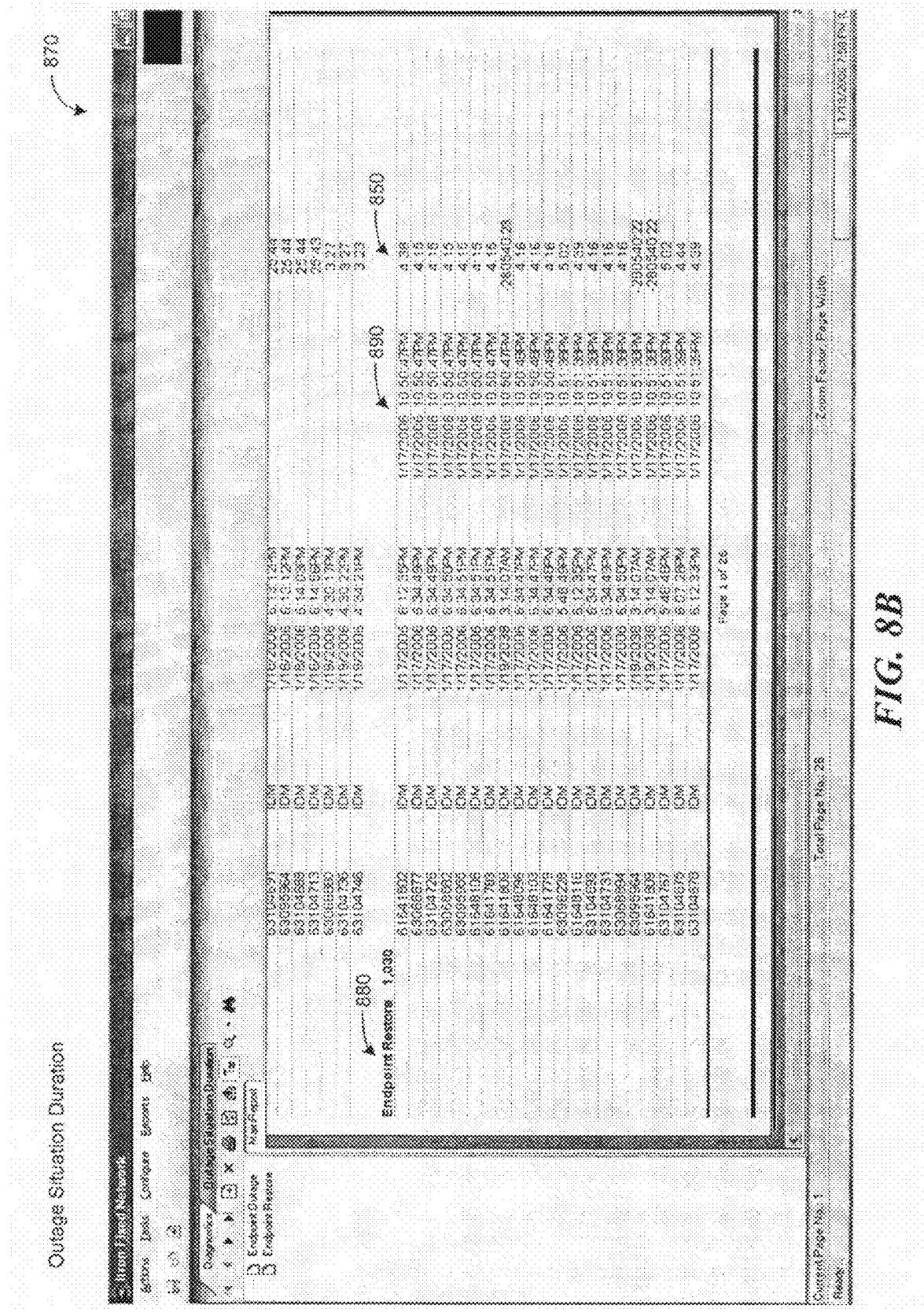

FIG. 7 illustrates an example type mask in which two types, 3 and 5, are identified. The top row of the table in FIG. 7 merely indicates the bit position number of each of the mask bits. The desired bits, or the masked bits, may be identified by a 0 or a 1 and the rest of the bits will be identified by their complements, 1 or 0, respectively. In this Figure a "1" identifies a desired bit.

For customers that want to read only one type of endpoint, like water customers, the host processor may only enable, for example, bit 3 for water endpoints. Therefore, only water endpoint data will be sent to the meter reading application program. By reducing the data flow in such manner, the burden on the communications channel is greatly reduced. Hence, a low cost system using a slower handheld computer can be used for mobile meter readings without missing desired endpoint data as a result of other endpoint traffic in the area.

In another embodiment, type filtering capability may be utilized for problem identification as well. For example, when an endpoint encounters a problem or failure, it changes its type to type-15. If a water customer wants to identify all of her/his water endpoints and any failed, type-15, endpoints, the mask will be set to accept these two types. Once the type-15 endpoints are found, the ID of the endpoint will be matched to an address and the malfunctioning endpoint can be replaced. In this case any failed endpoint will be identified, regardless of whether it is a water, a gas, or an electric endpoint. In other embodiments specific type numbers may be designated for a failed water endpoint, a failed gas endpoint, or a failed electric endpoint, etc. In another embodiment a reader may be directed to check at least one other specific information of a message once the message is initially screened by its type.

In some cases an endpoint may be configured to transmit multiple type numbers. In such cases more than one type may also be identified by the mask for discriminating an endpoint. If multiple types are identified by a mask, then some directives, such as a Boolean function, may also be handed to the reader by the host processor, which specifies to the reader how to use the mask information for sifting the endpoints. For example if an endpoint transmits one type number to specify the utility type and another type number to specify malfunctioning, then a mask can set two bits, one for water and one for malfunctioning, and a Boolean function can direct the reader to either pass the data for all malfunctioning water endpoints or all water endpoints and all malfunctioning endpoints. Or, for example, a mask can be set along with a Boolean relation to identify the data for all the gas endpoints and only the malfunctioning water endpoints, etc. In yet another embodiment an "OR," an "AND," or any other Boolean relation may be designated as a default directive.

Figure 8A:
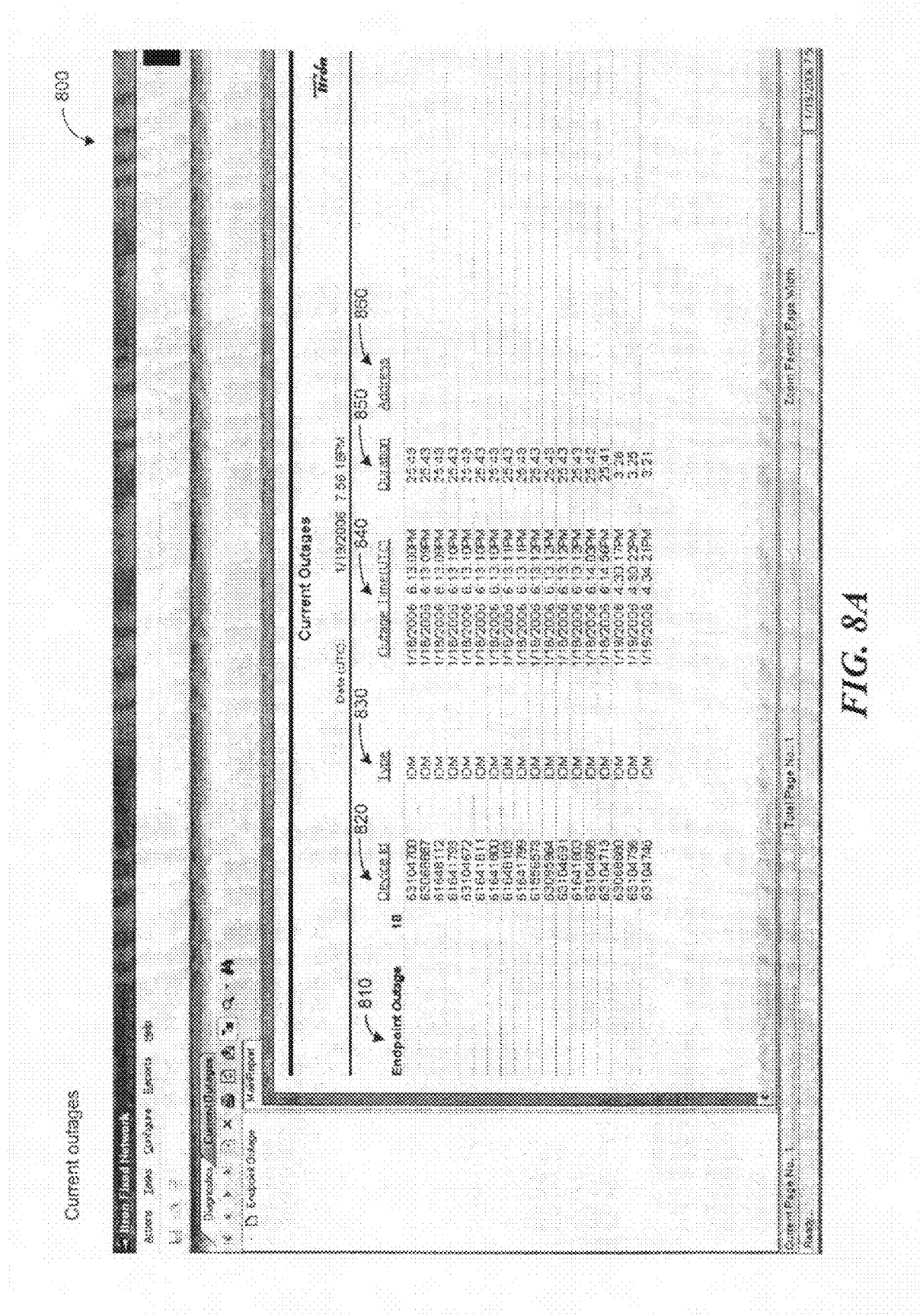

FIG. 8 illustrates a simple filtering process, performed for example by a dedicated processor, or an auxiliary computer, in which at step 810 an endpoint message is received by the reader. At step 812, the message type is compared with the allowed types indicated by the mask or the type number(s) received from the host processor. At step 814 a decision is made based on the matching result of step 812, and the message is either sent to the host processor (step 816) or the message is ignored (step 818). Mask information and/or directive functions may be stored in the DCU processor and be referred to by the host processor or be sent to the DCU processor when needed and be stored thereafter for processing purposes.

Type filtering reduces the processing demands placed on a processor running the meter reading application, which is not limited to SCM messages. As the number of message types increases such as with the use of versatile message packet 100, for example, the type filter can also be used to distinguish packet types. For instance, if there is a need to look for a versatile packet (e.g., type-25), then the filter can be set for type-25 packets only to be passed to the application. Messages of variable lengths may also be handled by the disclosed embodiments of this invention. As described above, variable length messages in some embodiments, have special fields with information about their lengths. In embodiments handling such cases, instead of a bit mask, the type number or numbers can be passed to the radio when the number of bits in a bit mask is large.

In another embodiment, a customer service system employs the information obtained using type filtering to automatically schedule service and repair of customer equipment, such as meters and endpoints. In this system, specific message types that indicate a need for repair or attention are routed to one or more system modules that perform service scheduling. Filtered messages that indicate some required services may be transmitted from a reader directly to a service scheduling module; to a service scheduling module through the host processor; to both the service scheduling module and to the host processor; or to the service scheduling module through any other route. In other embodiments the filtered message that indicates service necessity may not itself be sent to the service scheduling module; rather, a corresponding service-request message may be sent instead.

Figure 9:
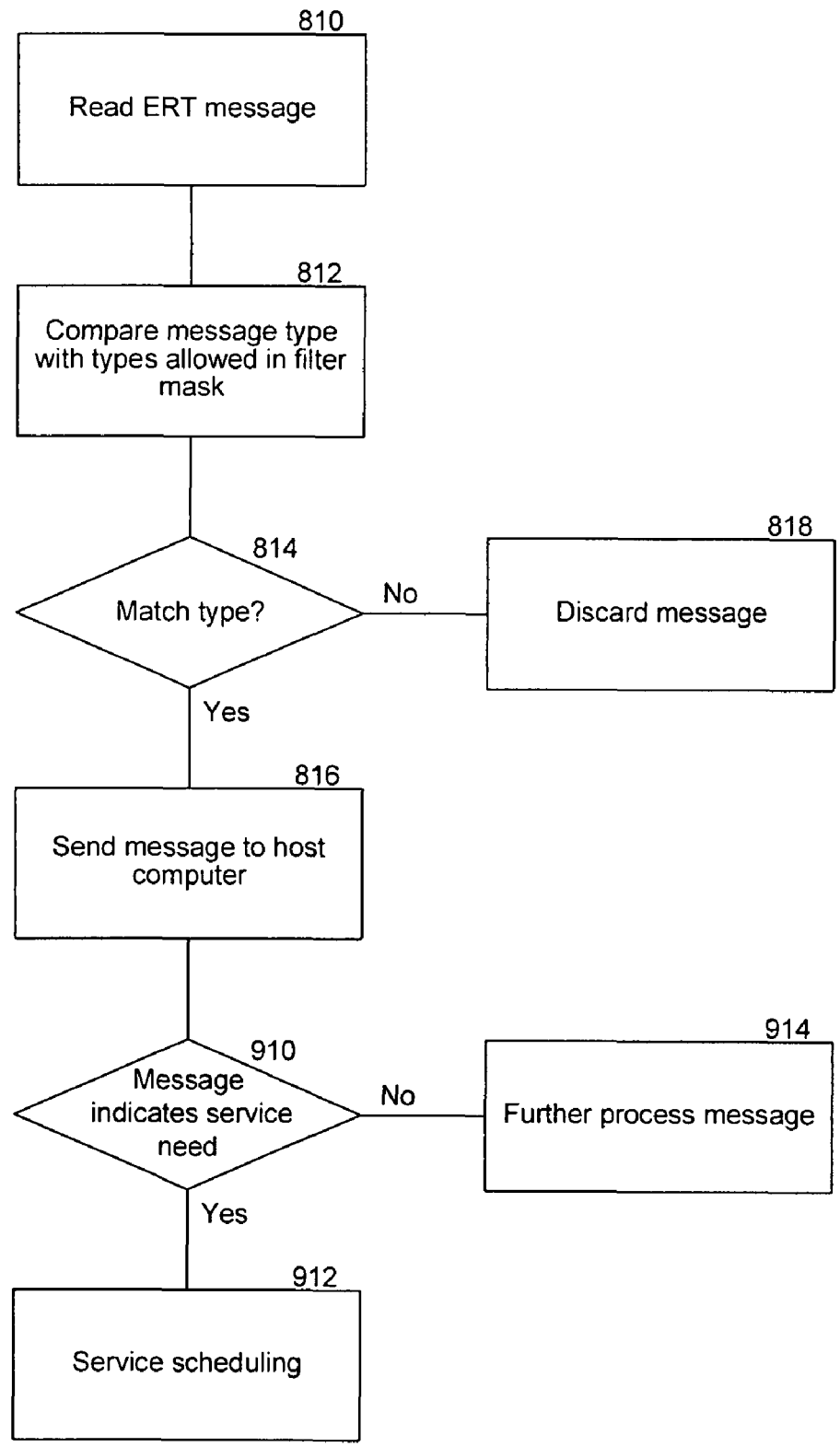
FIG. 9 illustrates an example process of an automatic service scheduling system utilizing message type filtering in accordance with an embodiment of the invention.

FIG. 9 illustrates an example process of an automatic service scheduling system utilizing message type filtering in accordance with an embodiment of the invention. As depicted in FIG. 9, at step 910, the host computer determines whether the received message necessitates service scheduling, and accordingly, at step 912, may send a service scheduling message to the service scheduling module(s). However, if the received message does not necessitate service scheduling, at step 914 the host computer may perform other processes on the message.

In yet another embodiment, the reader or the host processor may be configured to further sift the service-required messages and only relay some of those messages to the service scheduling module(s). In an alternative embodiment, the service scheduling module(s) may dictate to the reader or to the host processor how to further sift the service-required messages and to only pass specific messages to the service scheduling module(s).

Various modifications to the invention may be apparent to one of skill in the art upon reading this disclosure. For example, the present disclosure of the various embodiments of the invention relating to endpoint devices applies to endpoint devices that are integral with utility meters, in addition to module-type endpoint devices that interface with separate utility meters, as will be understood by persons of ordinary skill in the relevant art. The above description, and the description of the subject matter incorporated by reference herein, are therefore not contemplated to limit the scope of the present invention, which is limited only by the appended claims and their equivalents. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A utility meter endpoint for use in an encoder-receiver-transmitter (ERT)-compatible automatic meter reading (AMR) system, comprising: a utility meter interface that receives utility meter information from a utility meter; a radio that communicates with the AMR system; a processor operatively coupled with the utility meter interface and with the radio, wherein the processor converts the utility meter information into packets for transmission by the radio, wherein the packets include a first type of packet that has: a packet preamble portion that has a frame synchronization bit sequence, a packet type identifier field, and a packet length field, wherein the frame synchronization bit sequence is recognizable by an AMR system receiver that detects a preamble having a value of 0x16A3; a packet body portion that includes at least an endpoint serial number field and a message; and a packet validation portion; wherein the packet body portion has a length that is variable by the processor and the packet length field is set by the processor to represent the length, and the packet preamble portion is preceded by a training sequence having a repeating bit pattern of 01.

2. The utility meter endpoint of claim 1 wherein the frame synchronization bit sequence has a bit sequence consisting of 0x16A3.

3. The utility meter endpoint of claim 1, wherein the packet type identifier field consists of the bit pattern 0x1D.

4. The utility meter endpoint of claim 1, wherein the packet validation portion includes a packet cyclical redundancy check (CRC).

5. A utility meter endpoint for use in an encoder-receiver-transmitter (ERT)-compatible automatic meter reading (AMR) system, comprising: a utility meter interface that receives utility meter information from a utility meter; a radio that communicates with the AMR system; a processor operatively coupled with the utility meter interface and with the radio, wherein the processor converts the utility meter information into packets for transmission by the radio, wherein the packets include a first type of packet that has: a packet preamble portion that has a frame synchronization bit sequence, a packet type identifier field, and a packet length field, wherein the frame synchronization bit sequence is recognizable by an AMR system receiver that detects a preamble having a value of 0x16A3; a packet body portion that includes at least an endpoint serial number field and a message; and a packet validation portion; wherein the packet body portion has a length that is variable by the processor and the packet length field is set by the processor to represent the length; wherein the message includes a message type identifier field consisting of an outage notification code and a message value field including an outage event counter value.

6. The utility meter endpoint of claim 5, wherein the message includes a message cyclical redundancy check (CRC) field that validates contents of the message value field.

7. The utility meter endpoint of claim 5, wherein the outage notification code is a byte selected from the group consisting of: 0x50, 0x52, and 0x54.

8. A utility meter endpoint for use in an encoder-receiver-transmitter (ERT)-compatible automatic meter reading (AMR) system, comprising: a utility meter interface that receives utility meter information from a utility meter; a radio that communicates with the AMR system; a processor operatively coupled with the utility meter interface and with the radio, wherein the processor converts the utility meter information into packets for transmission by the radio, wherein the packets include a first type of packet that has: a packet preamble portion that has a frame synchronization bit sequence, a packet type identifier field, and a packet length field, wherein the frame synchronization bit sequence is recognizable by an AMR system receiver that detects a preamble having a value of 0x16A3; a packet body portion that includes at least an endpoint serial number field and a message; and a packet validation portion; wherein the packet body portion has a length that is variable by the processor and the packet length field is set by the processor to represent the length; and wherein the message includes a message type identifier field consisting of a restoration code and a message value field including an outage event counter value.

9. The utility meter endpoint of claim 8, wherein the outage event counter value includes a value representing an elapsed time.

10. The utility meter endpoint of claim 8, wherein the restoration code is a byte selected from the group consisting of: 0x51, 0x53, and 0x55.

11. The utility meter endpoint of claim 8, wherein the message value field includes at least one originating device sub-field that represents an identification of a device that originated at least a portion of the message.

12. A utility meter endpoint for use in an encoder-receiver-transmitter (ERT)-compatible automatic meter reading (AMR) system, comprising: a utility meter interface that receives utility meter information from a utility meter; a radio that communicates with the AMR system; a processor operatively coupled with the utility meter interface and with the radio, wherein the processor converts the utility meter information into packets for transmission by the radio, wherein the packets include a first type of packet that has: a packet preamble portion that has a frame synchronization bit sequence, a packet type identifier field, and a packet length field, wherein the frame synchronization bit sequence is recognizable by an AMR system receiver that detects a preamble having a value of 0x16A3; a packet body portion that includes at least an endpoint serial number field and a message; and a packet validation portion; wherein the packet body portion has a length that is variable by the processor and the packet length field is set by the processor to represent the length; and wherein the packet length field includes a value that represents a length of a remaining portion of the first type of packet that follows the packet length field.

13. A method of receiving a versatile radio packet over a communication channel in an encoder-receiver-transmitter (ERT)-compatible automatic meter reading (AMR) system, the method comprising: monitoring the communication channel for incoming data having a bit sequence that substantially includes a frame synchronization sequence having a value of 0x16A3; in response to detecting of the frame synchronization sequence: processing a 1-byte packet type ID field that immediately follows the frame synchronization sequence; in response to detecting of the frame synchronization sequence and a packet type ID field having a value corresponding to a versatile radio packet: processing a packet length field that immediately follows the packet ID field; processing a message type identifier field that immediately follows the length field; processing an endpoint ID field that immediately follows the message type ID field; processing a serial number field that immediately follows the endpoint ID field; and processing a message value field having a length corresponding to a remaining packet length value represented by the packet length field; such that individual information items carried in the versatile radio packet are read to obtain utility meter-related data.

14. The method of claim 13, wherein the monitoring of the communication channel includes buffering the incoming data.

15. The method of claim 13, further comprising: in response to the detecting of the frame synchronization sequence and the packet type ID field having the value corresponding to a versatile radio packet: processing a packet CRC field, including computing a packet CRC field based on the processed fields.

16. The method of claim 13, wherein the processing of the message type identifier field includes determining whether a message CRC field is present immediately following the message value field.

17. The method of claim 13, wherein: the packet type ID field value corresponding to a versatile packet is 0x1D.

18. The method of claim 13, wherein: the packet length field has a length of 2 bytes; the message type identifier field has a length of 1 byte; and the endpoint field has a length of 4 bytes.

19. The method of claim 13, wherein the message value field has a length that can vary depending upon a message type selected from a set of predefined message types; and wherein each of the packet length field, the message type identifier field, and the endpoint ID field has a predefined fixed length irrespective of the selected message type.

20. An reader configured to receive a versatile radio packet over a communication channel in an encoder-receiver-transmitter (ERT)-compatible automatic meter reading (AMR) system, the reader comprising: a receiver interfaced with the communication channel and having a controller, the controller including: means for monitoring the communication channel to detect incoming data having a bit sequence that substantially includes a frame synchronization sequence having a value of 0x16A3 and, in response to a detection of the frame synchronization sequence, process a 1-byte packet type ID field that immediately follows the frame synchronization sequence; means for processing a versatile radio packet in response to a detection of the frame synchronization sequence and a packet type ID field having a value corresponding to the versatile radio packet, including: means for processing a packet length field that immediately follows the packet ID field; means for processing a message type identifier field that immediately follows the length field; means for processing an endpoint ID field that immediately follows the message type ID field; means for processing a serial number field that immediately follows the endpoint ID field; and means for processing a message value field having a length corresponding to a remaining packet length value represented by the packet length field; wherein the controller causes the reader to read individual information items carried in the versatile radio packet to obtain utility meter-related data.

21. The reader of claim 20, wherein the receiver includes means for buffering the incoming data.

22. The reader of claim 20, wherein the controller includes means for processing a packet CRC field based on the processed fields.

23. The reader of claim 20, wherein the controller includes means for processing the message type identifier field by at least determining whether a message CRC field is present immediately following the message value field.

24. The reader of claim 20, wherein the controller includes means for processing the versatile message packet in which the packet type ID field value corresponding to a versatile packet is 0x1D.

25. The reader of claim 20, wherein the controller includes means for processing the versatile message packet, in which: the packet length field has a length of 2 bytes; the message type identifier field has a length of 1 byte; and the endpoint field has a length of 4 bytes.

26. The reader of claim 20, wherein controller causes the receiver to process the versatile message packet in which the message value field has a length that can vary depending upon a message type selected from a set of predefined message types; and wherein each of the packet length field, the message type identifier field, and the endpoint ID field has a predefined fixed length irrespective of the selected message type.

27. In an encoder-receiver-transmitter (ERT)-based automatic meter reading (AMR) system that utilizes interval daily messaging (IDM) wherein IDM packets have a frame synchronization sequence field of 0x16A3, followed by a packet type ID field, a method of configuring the AMR system to enable receiving a versatile message packet, the method comprising: configuring a reader to respond to a packet type ID that corresponds to a versatile message packet such that the reader processes a length field that follows the packet ID field to determine a remaining length of the versatile message packet.

28. The method of claim 27, wherein the step of configuring the reader includes: reading a message type identifier field that follows the length field; reading an encoder-receiver-transmitter (ERT) ID field that follows the message type ID field; reading a serial number field that follows the ERT ID field; and reading a message value field having a length corresponding to the determined length of the versatile message packet.

29. The method of claim 27, wherein the step of configuring the reader includes: associating a first message type identifier with a first message priority level and a second message type identifier with a second priority level that is different from the first priority level; and responding to the packet type ID that corresponds to the versatile message packet such that the reader: reads a message type identifier field that follows the length field; and compares a value of the message type identifier field with at least one of the first message type identifier and the second message type identifier to determine a priority level at which to process the versatile message packet.

30. A method of data discrimination in a utility meter reading system having a plurality of utility meter endpoints, each endpoint wirelessly transmitting utility meter data to at least one reader to be relayed to a processing center, the method comprising: receiving, by a reader, data from an endpoint, wherein the data includes at least one type indicator; receiving, by the reader, type-discriminating information that is indicative of a type of data to be relayed to the processing center; identifying, by the reader, a first item of utility meter data to be relayed to the processing center based on the type-discriminating information; relaying, by the reader, the first item of utility meter data to the processing center; transmitting, by a first endpoint of the utility meter reading system, utility meter data having multiple type-indicators; and managing, by the reader, the multiple type indicators, based on at least one management scheme selected from the group consisting of: receiving, from a remote source, a logical function indicative of how to apply the type-discriminating information to multiple type-indicators; and applying a predetermined default logical function that defines how the type-discriminating information is to be applied to multiple type-indicators in an absence of an overriding logical function.

31. The method of claim 30, wherein the step of receiving the type-discriminating information includes receiving a type-discriminating mask, and wherein the step of identifying the first item of utility meter data includes applying the type-discriminating mask to the data from the endpoint.

32. The method of claim 30, further comprising a step of transmitting the type-discriminating information by the processing center.

33. The method of claim 30, wherein the step of identifying the first item of utility meter data includes comparing a message type indication from the type-discriminating information with a message type indication of the first item of utility meter data.

34. An automatic meter reading (AMR) system reader that receives utility consumption information from a plurality of utility meter endpoints via an AMR communication channel, wherein the utility consumption information includes a plurality of data types, the reader being configured to relay certain data items from the utility consumption information to a processing center, the reader comprising: a radio circuit coupled to the communication channel; and a controller coupled to the radio circuit, wherein the controller is programmed to cause the reader to: receive type-discriminating information, wherein the type-discriminating information is indicative of a type of data to be relayed to the processing center; identify a first item of utility meter data to be relayed to the processing center based on the type-discriminating information; and relay the first item of utility meter data to the processing center, and wherein said controller is further programmed to transmit, by a first endpoint of the utility meter reading system, utility meter data having multiple type-indicators, and to manage, by the reader, the multiple type indicators, based on at least one management scheme selected from the group consisting of: receiving, from a remote source, a logical function indicative of how to apply the type-discriminating information to multiple type-indicators, and to apply a predetermined default logical function that defines how the type-discriminating information is to be applied to multiple type-indicators in an absence of an overriding logical function.

35. The AMR system reader of claim 34, wherein the type-discriminating information includes a bit mask.

36. The AMR system reader of claim 34, wherein the controller is programmed to not relay certain items of utility meter data based on the type-discriminating information.

37. The AMR system reader of claim 34, wherein the controller is programmed to manage multiple type indicators in the utility consumption information based on at least one management scheme that is selected from the group consisting of: (a) being pre-configured in the controller, or (b) being received from a remote source, or both (a) and (b).

* * * * *